(12) United States Patent
Epstein

(10) Patent No.: US 12,034,118 B2
(45) Date of Patent: Jul. 9, 2024

(54) RECHARGEABLE ENERGY-STORAGE DEVICE INCLUDING PARTIALLY-HYDROLYZED STRUCTURAL HYDROGEL

(71) Applicant: Scott M. Epstein, Medfield, MA (US)

(72) Inventor: Scott M. Epstein, Medfield, MA (US)

( * ) Notice: Subject to any disclaimer, the term of this patent is extended or adjusted under 35 U.S.C. 154(b) by 105 days.

(21) Appl. No.: 17/652,556

(22) Filed: Feb. 25, 2022

(65) Prior Publication Data

US 2022/0278367 A1 Sep. 1, 2022

Related U.S. Application Data

(60) Provisional application No. 63/154,377, filed on Feb. 26, 2021.

(51) Int. Cl.
*H01M 10/0565* (2010.01)
*H01M 10/058* (2010.01)

(52) U.S. Cl.
CPC ..... *H01M 10/0565* (2013.01); *H01M 10/058* (2013.01); *H01M 2300/0085* (2013.01)

(58) Field of Classification Search
CPC ........... H01M 10/0565; H01M 10/058; H01M 2300/0085
See application file for complete search history.

(56) References Cited

U.S. PATENT DOCUMENTS

| | | | |
|---|---|---|---|
| 2,579,451 A | 12/1951 | Polson | |
| 2,721,133 A | 10/1955 | Warren | |
| 2,812,317 A | 11/1957 | Barrett | |
| 2,861,059 A | 11/1958 | Mowry et al. | |
| 3,200,102 A | 8/1965 | Helmut | |
| 3,368,015 A | 2/1968 | Wilhelm et al. | |
| 3,864,323 A | 2/1975 | Stoy | |
| 3,895,169 A | 7/1975 | Wichterle | |
| 3,897,382 A | 7/1975 | Stoy et al. | |
| 3,926,930 A | 12/1975 | Ohfuka et al. | |
| 3,948,870 A | 4/1976 | Stoy et al. | |
| 4,107,121 A | 8/1978 | Stoy | |
| 4,123,406 A | 10/1978 | Stoy et al. | |
| 4,228,056 A | 10/1980 | Stoy | |
| 4,272,422 A | 6/1981 | Tanaka | |
| 4,366,206 A | 12/1982 | Tanaka | |

(Continued)

FOREIGN PATENT DOCUMENTS

| | | | |
|---|---|---|---|
| JP | 2003510422 | * | 3/2003 |
| JP | 2003510422 A | | 3/2003 |

(Continued)

OTHER PUBLICATIONS

JP 2003510422MT (Year: 2003).*

(Continued)

*Primary Examiner* — Alexander Usyatinsky
(74) *Attorney, Agent, or Firm* — Intrinsic Law Corp.

(57) ABSTRACT

A rechargeable energy-storage device includes an anode; a cathode; a structural hydrogel disposed between the anode and the cathode, the structural hydrogel having hydrophilic segments and hydrophobic segments; and a porous carbon material disposed between the anode and the cathode. The hydrophilic segments and hydrophobic segments are uniformly distributed within the structural hydrogel.

10 Claims, 26 Drawing Sheets

(56) References Cited

U.S. PATENT DOCUMENTS

| | | | |
|---|---|---|---|
| 4,379,874 | A | 4/1983 | Stoy |
| 4,943,618 | A | 7/1990 | Stoy et al. |
| 5,218,039 | A | 6/1993 | Stoy et al. |
| 5,252,692 | A | 10/1993 | Lovy et al. |
| 5,688,855 | A | 11/1997 | Stoy et al. |
| 5,741,828 | A | 4/1998 | Stoy et al. |
| 6,114,068 | A * | 9/2000 | Yamada ............ H01M 10/0565 429/300 |
| 6,187,061 | B1 * | 2/2001 | Amatucci ............ H01M 16/00 29/25.03 |
| 6,232,406 | B1 | 5/2001 | Stoy |
| 6,726,721 | B2 | 4/2004 | Stoy et al. |
| 8,318,385 | B2 | 11/2012 | Jang et al. |
| 9,966,199 | B2 | 5/2018 | Zhamu et al. |
| 11,120,952 | B2 | 9/2021 | Zhamu et al. |
| 11,171,388 | B2 | 11/2021 | He et al. |
| 2001/0050749 | A1 * | 12/2001 | Watanabe ................ C08J 7/18 351/159.33 |
| 2019/0379045 | A1 * | 12/2019 | He ......................... H01M 4/38 |
| 2021/0206900 | A1 | 7/2021 | Chung |
| 2022/0247038 | A1 * | 8/2022 | Abusleme ............ H01M 50/42 |

FOREIGN PATENT DOCUMENTS

| | | |
|---|---|---|
| JP | 2005019418 A | 1/2005 |
| WO | 2019213159 A1 | 11/2019 |
| WO | WO 2021/018615 * | 2/2021 |

OTHER PUBLICATIONS

N. A. Plate, et al., in the Journal of Polymer Science, vol. 12, 2165-2185 (1974).

International Search Report for PCT/US2022/070835, dated Jun. 10, 2022.

* cited by examiner

RECHARGEABLE ENERGY-STORAGE DEVICE INCLUDING PARTIALLY-HYDROLYZED STRUCTURAL HYDROGEL

CROSS-REFERENCE TO RELATED APPLICATIONS

This application claims priority to U.S. Provisional Application No. 63/154,377, titled "Very High Aqueous Content Structural Hydrogel," filed on Feb. 26, 2021, which is hereby incorporated by reference.

TECHNICAL FIELD

This application relates generally to energy-storage devices.

BACKGROUND

Conventional energy-storage devices have a limited lifespan due to degradation of the materials and/or structure over time. For example, conventional energy-storage devices heat up and expand during charging (or discharging) and then contract when the energy-storage device is not in use.

It would be desirable to overcome these and/or other deficiencies in the art.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a rechargeable energy-storage device comprising: an anode; a cathode; a structural hydrogel disposed between the anode and the cathode, the structural hydrogel having hydrophilic segments and hydrophobic segments; and a porous carbon material disposed between the anode and the cathode.

In one or more embodiments, the structural hydrogel is saturated with an electrolyte. In one or more embodiments, the structural hydrogel includes polyanions. In one or more embodiments, the structural hydrogel is configured to provide a path for ions and charge to pass between the anode and the cathode.

In one or more embodiments, the structural hydrogel is coagulated. In one or more embodiments, the structural hydrogel comprises a partially-hydrolyzed polyacrylonitrile (PH-PAN) material, and the hydrophilic segments are uniformly distributed within the structural hydrogel matrix. In one or more embodiments, the PH-PAN material is hydrolyzed by about 30% to about 45%.

In one or more embodiments, the porous carbon material is disposed between the structural hydrogel and the anode. In one or more embodiments, the porous carbon material comprises porous carbon material particles, the porous carbon material particles disposed in the structural hydrogel. In one or more embodiments, the structural hydrogel is mechanically coupled to the porous carbon material.

Another aspect of the invention is directed to a method of manufacturing a rechargeable energy-storage device, the method comprising: placing an anode material to form at least a portion of a first layer in a container; adding a gelled structural hydrogel to form at least a second layer in the container, the gelled structural hydrogel in physical contact with the anode material, the gelled structural hydrogel having hydrophilic segments and hydrophobic segments; adding a porous carbon material to the container to form at least a portion of a third layer in the container, the second layer between the first and third layers; pushing the porous carbon material toward the anode material such that the porous carbon material is located between the anode material and a volume of the gelled structural hydrogel; adding a cathode material to the container on the volume of the gelled structural hydrogel; and coagulating the gelled structural hydrogel to form a solid structural hydrogel.

In one or more embodiments, the method further comprises saturating the solid structural hydrogel with an electrolyte solution.

In one or more embodiments, the gelled structural hydrogel comprises a partially-hydrolyzed polyacrylonitrile (PH-PAN) material. In one or more embodiments, the hydrophilic segments and the hydrophobic segments are uniformly distributed within the PH-PAN. In one or more embodiments, the PH-PAN material is hydrolyzed by about 30% to about 45%.

In one or more embodiments, the coagulating step includes mechanically coupling the solid structural hydrogel to the anode material.

Another aspect of the invention is directed to a method of manufacturing a rechargeable energy-storage device, the method comprising: placing an anode material to form at least a portion of a first layer in a container; adding a mixed material to form at least a second layer in the container, the mixed material comprising a gelled structural hydrogel and porous carbon material particles, the porous carbon particles disposed in the gelled structural hydrogel; adding a cathode material at least a portion of a third layer in the container, the second layer between the first and third layers; and coagulating the gelled structural hydrogel to form a solid structural hydrogel.

In one or more embodiments, the method further comprises adding the gelled structural hydrogel to the container; adding the porous carbon material particles to the container; and mixing the gelled structural hydrogel and the porous carbon material particles to form the mixed material.

In one or more embodiments, the method further comprises saturating the solid structural hydrogel with an electrolyte solution. In one or more embodiments, the gelled structural hydrogel comprises a partially-hydrolyzed polyacrylonitrile (PH-PAN) material, and the hydrophilic segments and the hydrophobic segments are uniformly distributed within the PH-PAN.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

Figure 1:
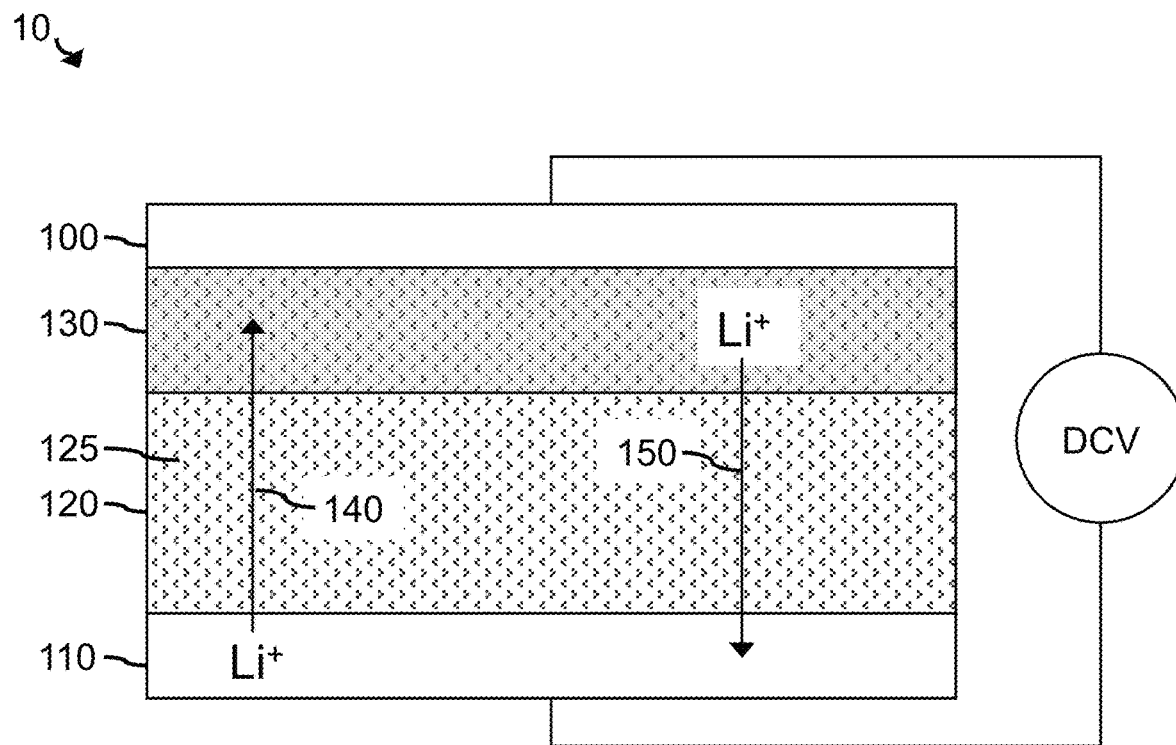
FIG. 1 is a cross-sectional view of a rechargeable energy-storage device according to an embodiment.

FIG. 1 is a cross-sectional view of a rechargeable energy-storage device 10 according to an embodiment. The energy-storage device 10 can be a supercapacitor, a battery, and/or another energy-storage device. The energy-storage device 10 includes an anode 100, a cathode 110, a structural hydrogel 120, and a porous carbon material 130. The device 10 is configured such that an ionic separation barrier/membrane (e.g., a barrier or a porous isolation membrane) is not required. The anode 100 can comprise or consist of a conductive metal and/or a conductive material. An example of a conductive material for the anode 100 includes conductive carbon, silicone, graphene, graphene coated copper, copper, nickel, or another conductive material. In one example, the conductive material can comprise a film, a foil, a foam, and/or a sheet. In a specific example, the conductive material can comprise a copper film, a copper foil, and/or a copper sheet.

The cathode 110 can comprise or consist of a conductive metal and/or a conductive material. An example of a conductive material for the cathode 110 includes aluminum, nickel, manganese, cobalt or another conductive material. In one example, the conductive material can comprise a film, a foil, a foam, and/or a sheet. In a specific example, the conductive material can comprise an aluminum film, an aluminum foil, and/or an aluminum sheet.

The structural hydrogel 120 (e.g., structural hydrogel matrix) can comprise or consist of a partially-hydrolyzed polyacrylonitrile (PH-PAN) or another structural hydrogel. The PH-PAN is coagulated into a solid and saturated (partially or fully) with an aqueous electrolyte solution 125. The electrolyte solution 125 can comprise or consist of an electrolyte such as lithium chloride (LiCl), sodium chloride (NaCl), magnesium chloride ($MgCl_2$), or another electrolyte (e.g., a salt). When saturated with an electrolyte, the structural hydrogel 120 can comprise polyanions and/or repeating soft hydrophilic segments of polymer saturated with electrolyte, which can become and/or position the polyanions. The polyanions can make the polymer (e.g., structural hydrogel 120) charged and/or can form a conductive path between anode 100 and cathode 110 (i.e., the positive and negative electrodes, respectively). One advantage of hydrogels is they can recover their initial shape after numerous repeated stretching cycles, which can enhance their response sensitivity and service-life-fatigue resistance and self-healing capability resistance to damage by sharp materials, exhibiting high conductivity.

Figure 2:
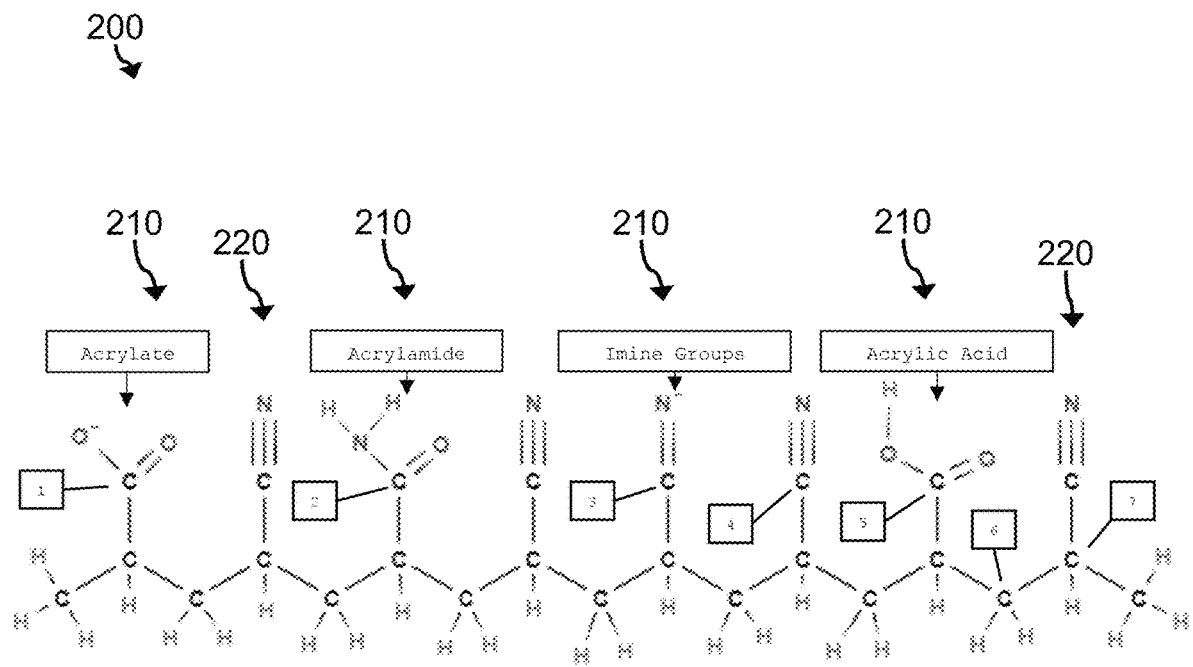
FIG. 2 illustrates an example of a PH-PAN with soft hydrophilic segments and hard hydrophobic segments.

The PH-PAN includes a plurality of soft hydrophilic segments and a plurality of hard hydrophobic segments. The soft hydrophilic segments comprise or consist of acrylate, acrylamide, imine, and/or acrylic acid groups formed on the PAN backbone. The hard hydrophobic segments comprise or consist of nitrile groups, which have not been converted to soft hydrophilic segments during partial hydrolysis. The ratio of soft hydrophilic segments to hard hydrophobic segments is determined by the percent hydrolysis or grade of the PAN. The soft hydrophilic segments can be uniformly distributed within or dispersed through the PH-PAN matrix. An example of a PH-PAN 200 with soft hydrophilic segments 210 and hard hydrophobic segments 220 is illustrated in FIG. 2. The soft and/or hard hydrophobic segments 210, 220 can comprise polyanions. Without being bound by theory, it is believed that the soft hydrophilic segments 210 are more likely to contain the polyanions due to their absorbent hydrophilic nature, while the hard hydrophobic segments 220 are less likely to contain the polyanions due to their hydrophobic nature. The ratio of soft hydrophilic segments to hard hydrophobic segments can determine the percentage swell of the PH-PAN when exposed to and/or saturated with an electrolyte solution, which corresponds to the amount of electrolyte solution absorbed and/or saturated by the PH-PAN. In addition, the ratio of soft hydrophilic segments to hard hydrophobic segments can determine the mechanical properties of the PH-PAN, such as its tensile strength, compressive strength, and/or elasticity.

Figure 3:
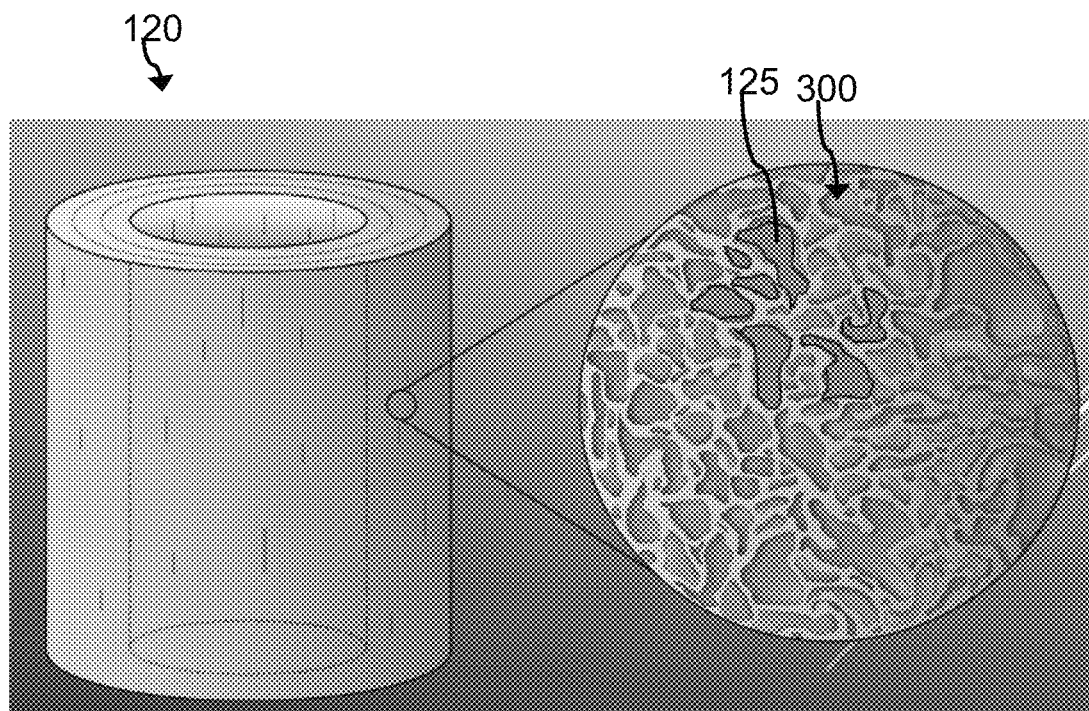
FIG. 3 illustrates voids in a coagulated structural hydrogel according to an embodiment.

In some embodiments, the coagulated structural hydrogel 120 (e.g., PH-PAN) can include voids 300, as illustrated in FIG. 3. The voids 300, if any, are formed during coagulation (e.g., as discussed below). Without being bound by theory, it is believed that the voids 300 may be related to and/or a function of the percent hydrolysis of the PAN. When the coagulated PH-PAN is introduced to the aqueous electrolyte solution 125, it is believed that the aqueous electrolyte solution 125 fills the voids 300 and/or saturates the soft hydrophilic segments which may swell into the voids. While only some of the voids 300 are illustrated as being filled with aqueous electrolyte solution 125 for illustration purposes, all or substantially all (e.g., at least 95% or at least 99%) of the voids 300 are filled (or the soft hydrophilic segments are saturated) with the aqueous electrolyte solution 125 when the PH-PAN is introduced to the aqueous electrolyte solution 125. It is noted that the coagulated structural hydrogel 120 is illustrated as a cylinder for illustration purposes only. The coagulated structural hydrogel 120 more closely resembles a solid rubbery substance.

When saturated with aqueous electrolyte solution 125, the coagulated structural hydrogel 120 (e.g., PH-PAN) can comprise up to about 95% by volume of aqueous electrolyte solution 125 with the balance (e.g., at least about 5% by volume) structural hydrogel polymer resin. As used herein, "about" means plus or minus 10% or plus or minus 5% of the relevant value. For example, the structural hydrogel 120 can comprise, by volume, about 90% to about 95% of aqueous content, about 80% to about 90% of aqueous content, about 70% to about 80% of aqueous content, about 60% to about 70% of aqueous content, about 50% to about 60% of aqueous content, or another volumetric concentration including any value or range between any two of the foregoing percentages.

For example, consider a structural hydrogel saturated with aqueous LiCl. LiCl has a solubility in water of about 440 grams LiCl/1 liter water. NaCl has a solubility in water of about 350 grams NaCl/1 liter water, which is about 20% lower than that of LiCl. Since about 20% of the mass of LiCl is lithium atoms and about 80% of the mass is chlorine atoms, one liter of water would have about 88 grams of lithium. If the structural hydrogel 120 is about 90% by volume of solvent (to be exchanged with electrolyte solution 125) and about 10% by volume of solids (polymer resin), there would be about 80 grams of lithium in 1 liter of saturated hydrogel. If that 1-liter volume was 10 cm×10 cm×10 cm, and where the density of Lithium is about 0.53 g/cm$^3$, then 80 grams of lithium would occupy about 160 cm$^3$ volume. For a 1-liter cell having a length and width of 10 cm×10 cm, that would mean the lithium media would be about 1.6 cm (0.62 inches) thick. That is significantly more lithium than a conventional lithium cell.

Returning to FIG. 1, the porous carbon material 130 can comprise or consist of graphene (e.g., a two-dimensional (2D) carbon material), graphite, and/or another porous carbon material (e.g., another activated carbon material). The porous carbon material 130 can be a foam, a foil, or another form. The porous carbon material 130 can be electrically conductive. In one example, the porous carbon material 130 is graphene, which is a 2D carbon material that is conductive, which provides both a large capacity for electrolyte (e.g., ion) storage and good mechanical flexibility and/or structural stability. The porous carbon material 130 and the structural hydrogel 120 are disposed between the anode 100 and the cathode 110. Though preferably located closer to the anode 100, the porous carbon material 130 can be disposed in the middle or closer to the cathode 110. The structural hydrogel 120 is mechanically entangled and/or mechanically attached to the porous carbon material 130 without forming a chemical bond and/or without an attachment agent such as an adhesive. The mechanical entanglement and/or mechanical attachment can occur when the structural hydrogel 120 coagulates on and/or over the porous carbon material 130. The porous carbon material 130 is illustrated as partially transparent to indicate that the porous carbon material 130 is embedded in the structural hydrogel 120 and/or that the structural hydrogel 120 is embedded in the porous carbon material 130. Thus, the structural hydrogel 120 can extend to and/or can be in physical contact with the anode 100 and cathode 110.

In operation, the electrolyte solution 125 is absorbed and/or saturated by the soft hydrophilic segments (e.g., soft hydrophilic segments 210) in the structural hydrogel 120, which can cause the structural hydrogel 120 to swell or shrink. Without being bound by theory, it is believed that the soft hydrophilic segments emulate a porous structure that can absorb and/or can be saturated with the electrolyte solution 125. When saturated with the electrolyte solution 125 and having the porous carbon material 130 for either active anode or cathode gathering electrodes, the device 10 includes integral polyanions which, without being bound by theory, are believed to be most likely in or within the soft hydrophilic segments, as discussed above. The ions in the electrolyte can travel between the anode 100 and cathode 110 through the voids 300, pores, and/or saturated soft hydrophilic segments, which can provide a direct path or pathway for the ions (e.g., with respect to an osmotic gradient) and electrons, allowing the structural hydrogel 120 to function as a conductor. The ions osmotically and/or electrically seek to equilibrate from a lower potential to a higher potential. In the case of charging 140, the ions in the electrolyte solution 125 flow (e.g. are conducted) from the cathode 110 to the anode 100. In the case of discharging 150, the ions in the electrolyte solution 125 flow (e.g. are conducted) from the anode 100 to the cathode 110. The hard hydrophobic segments can provide structural integrity for the structural hydrogel 120. In addition, the hydrophobic segments may provide electrical and/or ionic isolation and/or electrical and/or ionic insulation.

It is believed that the hard hydrophobic and/or soft hydrophilic segments allow the device 10 to function safely without ionic separation (e.g., a barrier or a porous isolation membrane). For example, it is believed that a highly-developed nano-porous structure, such as the structural hydrogel 120, with an affinity for electrolytes (e.g., in the soft hydrophilic segments) exhibiting a tortuous path of pores and/or compressed regions by swollen soft hydrophilic segments saturated with electrolyte and a cumulative large cross section of conducting pathway exhibiting a ratio (saturated soft hydrophilic segments (Resistance)/electrolyte (Resistance)) proportional to the time required for ions to travel thru suggests the sum of soft hydrophilic segments emulates a membrane. Li ion battery combining an aqueous electrolyte with a so-called gel polymer (e.g., structural hydrogel 120) addresses the safety concern of flammable electrolytes. The electrolyte-saturated soft hydrophilic segments can function as both the electrolyte and isolation membrane suppressing unstable interface and dangerous lithium dendrite growth promoting stronger anion and weaker cation coordination resulting in favorable Li transport. The electrolyte-saturated soft hydrophilic segments containing ionic liquid exhibiting both high ionic conductivity and Li ion transference fundamentally alter the solubility of salt within the electrolyte-saturated soft hydrophilic segments. Decreasing the binding affinity of the Li cation towards the polymer chains enables a rapid transfer of Li cations within the electrolyte-saturated polymer soft hydrophilic segment network. These structural features enable the immobilization of anions on the ionic liquid segments to alleviate the space-charge effect while promoting stronger anion coordination and weaker cation coordination in the polymers. Accordingly, a high Li ion conductivity and high Li ion transference number along with good electrochemical stability is exhibited while effectively suppressing Li dendrite growth.

The porous carbon material 130 provides a large surface area for storing charge and/or heteroatoms (e.g., ions). The porous carbon material 130 can store and/or accumulate electrostatic charges at the electrode-electrolyte interface and/or store the charges not involving chemical charge during the charging and discharging process. The porous carbon material 130 can also provide short paths for electrolyte (e.g., ion) transportation and large surface areas for electrolyte (e.g., ion) adsorption.

Figure 4:
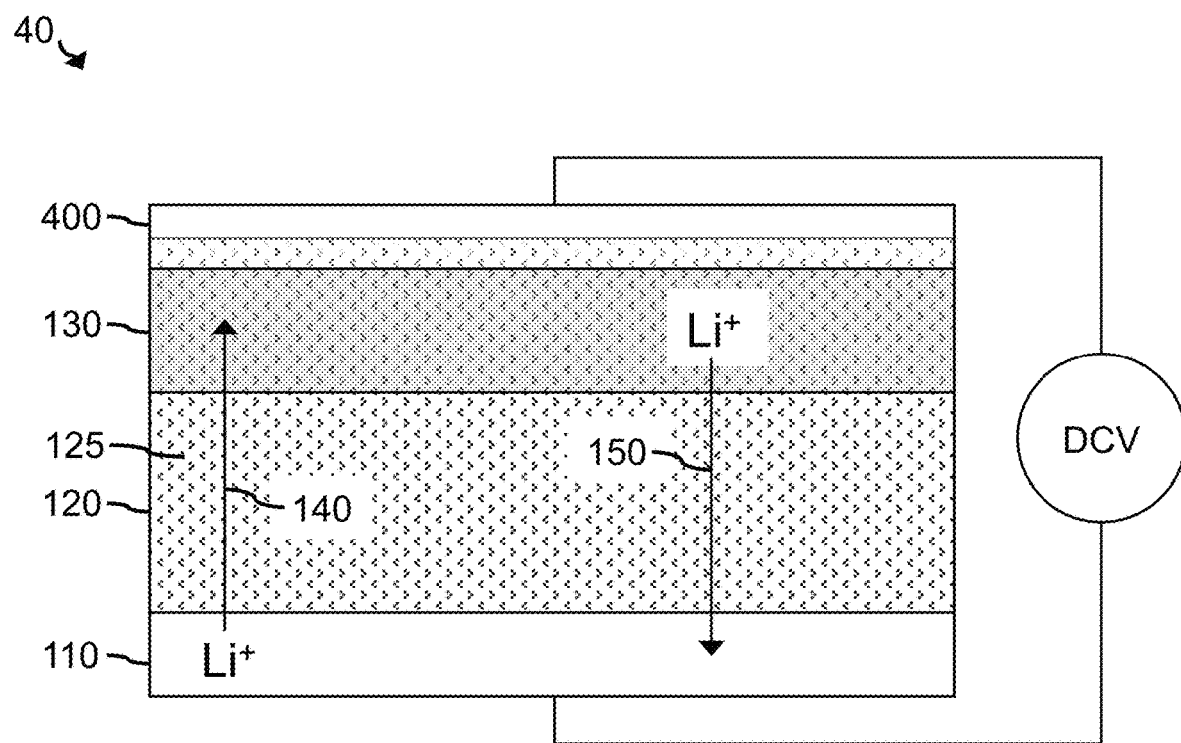
FIG. 4 is a cross-sectional view of a rechargeable energy-storage device according to another embodiment.

FIG. 4 is a cross-sectional view of a rechargeable energy-storage device 40 according to another embodiment. Device 40 is the same as device 10 except that in device 40 the anode 400 is porous (e.g., a porous copper foil, a porous copper foam, and/or a woven (e.g., open web porous) copper sheet) and the structural hydrogel 120 is mechanically entangled and/or mechanically attached to the porous anode 400 without forming a chemical bond and/or without an attachment agent such as an adhesive. The mechanical entanglement and/or mechanical attachment can occur when the structural hydrogel 120 coagulates on and/or over the porous anode 400. The porous anode 400 is illustrated as partially transparent to indicate that the porous anode 400 is embedded in the structural hydrogel 120 and/or that the structural hydrogel 120 is embedded in the porous anode 400.

Figure 5:
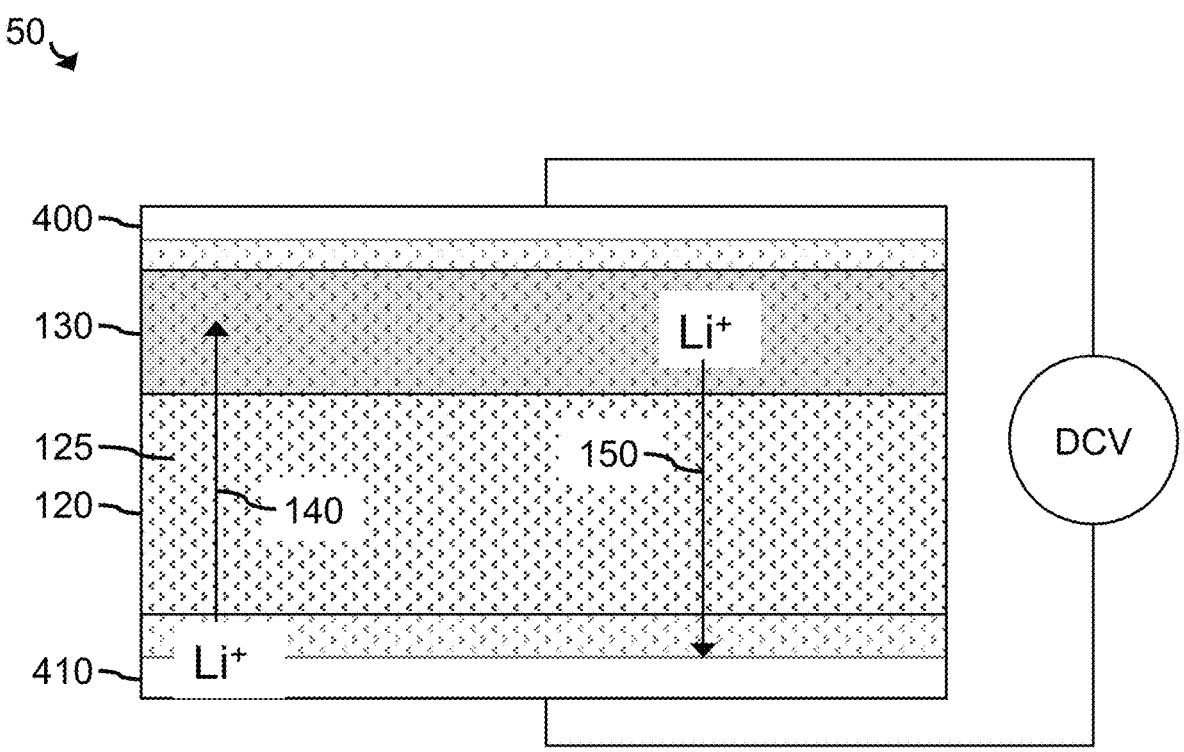
FIG. 5 is a cross-sectional view of a rechargeable energy-storage device according to another embodiment.

FIG. 5 is a cross-sectional view of a rechargeable energy-storage device 50 according to another embodiment. Device 50 is the same as device 40 except that in device 50 the cathode 410 is porous (e.g., a porous aluminum foil, a porous aluminum foam, and/or a woven (e.g., open web porous) aluminum sheet) and the structural hydrogel 120 is mechanically entangled and/or mechanically attached to the porous cathode 410 without forming a chemical bond and/or without an attachment agent such as an adhesive. The mechanical entanglement and/or mechanical attachment can occur when the structural hydrogel 120 coagulates on and/or over the porous cathode 410. The cathode 410 is illustrated as partially transparent to indicate that the porous cathode 410 is embedded in the structural hydrogel 120 and/or that the structural hydrogel 120 is embedded in the porous cathode 410.

Figure 6:
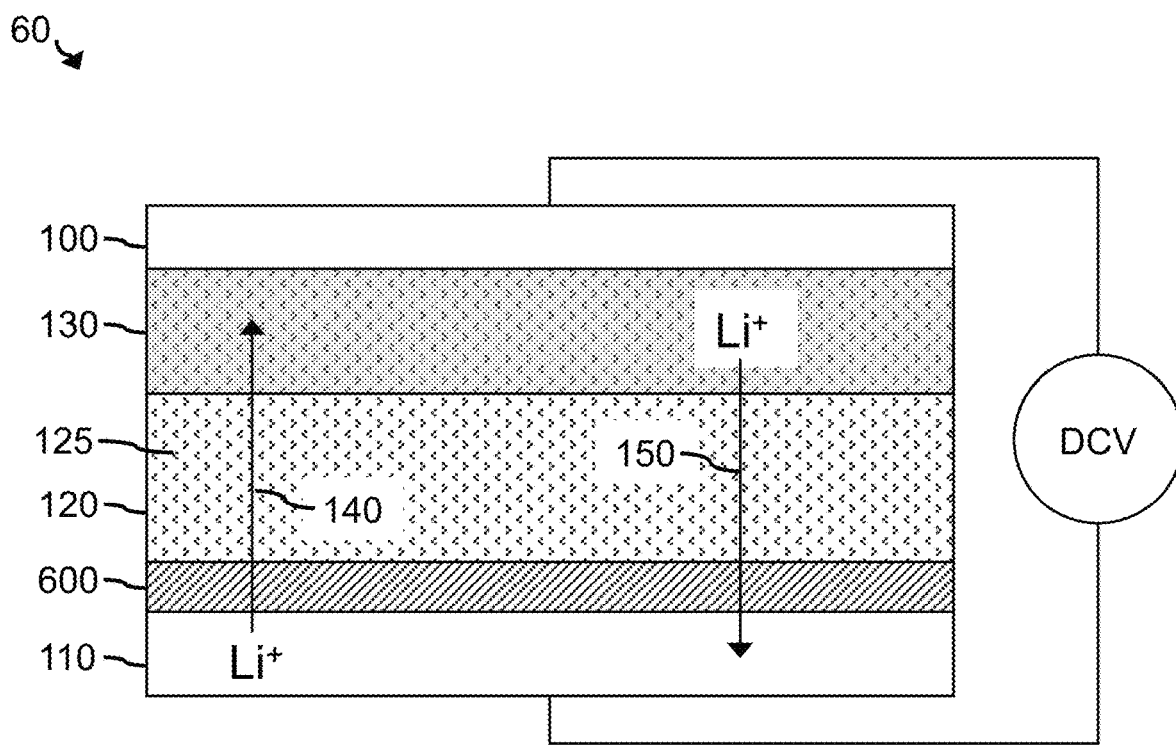
FIG. 6 is a cross-sectional view of a rechargeable energy-storage device according to another embodiment.

FIG. 6 is a cross-sectional view of a rechargeable energy-storage device 60 according to another embodiment. Device 60 is the same as device 10 except that device 60 includes a solid lithium layer 600 between the structural hydrogel 120 and the cathode 110. The solid lithium layer 600 is preferably in direct physical contact with the structural hydrogel 120 and the cathode 110. The solid lithium layer 600 can comprise a powder, pellets, or another solid form. It is noted that device 40 and/or device 50 can also include a solid lithium layer.

Figure 7:
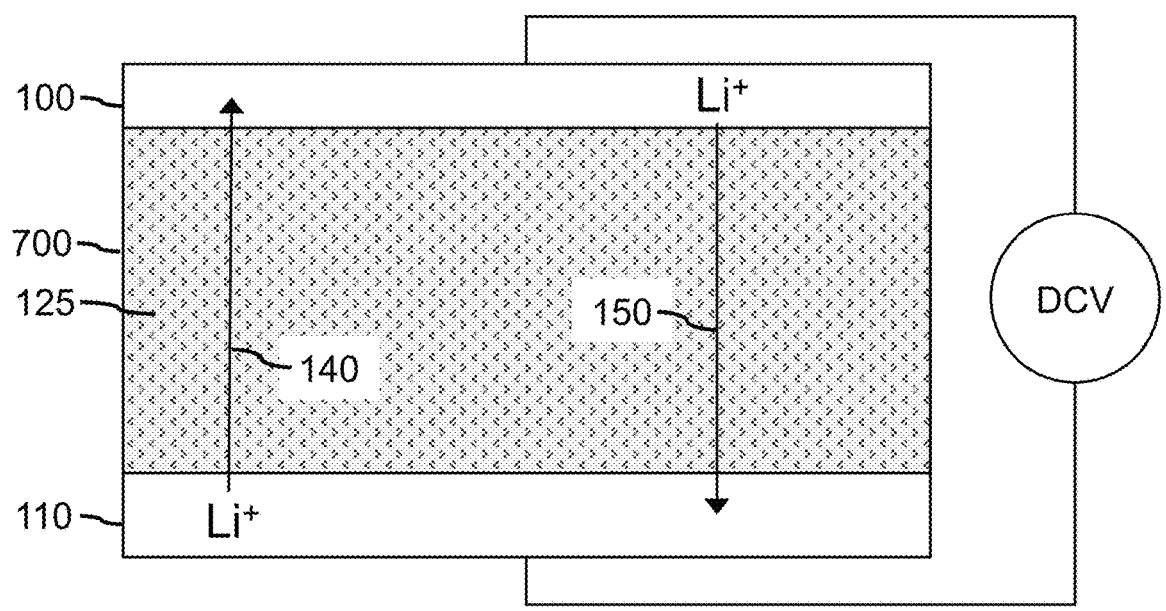
FIG. 7 is a cross-sectional view of a rechargeable energy-storage device according to another embodiment.

FIG. 7 is a cross-sectional view of a rechargeable energy-storage device 70 according to another embodiment. Device 70 is the same as device 10 except that device 70 includes a mixed material 700 in which particles of the porous carbon material are mixed, dispersed, suspended, and/or distributed in the structural hydrogel prior to coagulation. The particles of the porous carbon material are preferably uniformly and/or homogenously mixed, dispersed, distributed, suspended, and/or encapsulated in the mixed material 700. The dispersed porous carbon material is exposed on all sides of the electrolyte solution, resulting in a three-dimensional anode or cathode current collector structure. When saturated with or in contact with an electrolyte solution, the dispersed porous carbon material provides an energy storage cell that does not require an ion separation between the anode and cathode electrolyte reservoirs, which is needed in conventional energy-storage devices.

Figure 8A:
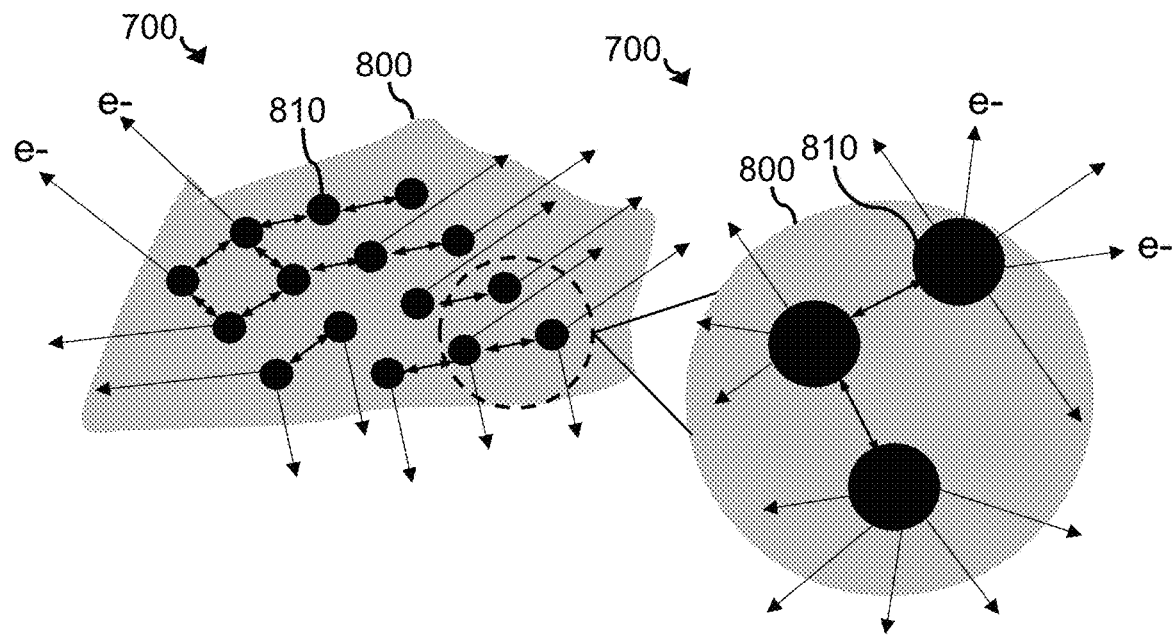
FIGS. 8A and 8B illustrate an example detailed view of a mixed material.
Figure 8B:
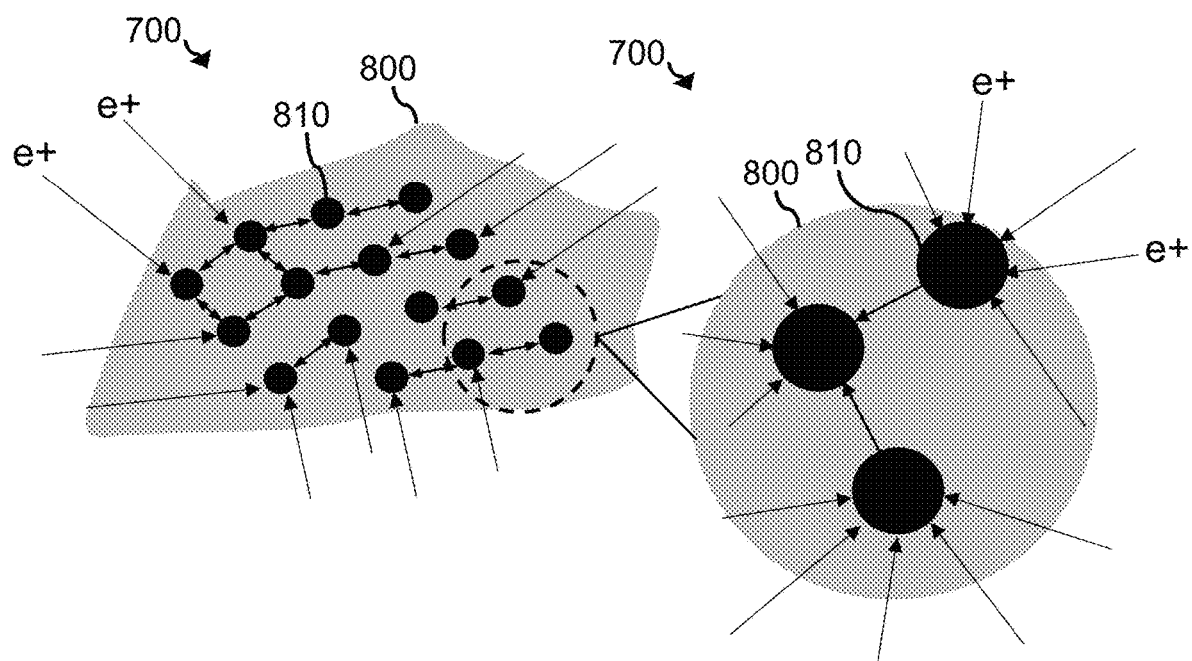

An example detailed view of the mixed material 700 is illustrated in FIGS. 8A and 8B. The mixed material 700 includes structural hydrogel 800 and porous carbon material particles 810. The structural hydrogel 800 can be the same as or different than the structural hydrogel 120. The porous carbon material particles 810 are disposed in the structural hydrogel 800. For example, the porous carbon material particles 810 can be mixed, dispersed, distributed, suspended, and/or encapsulated in the structural hydrogel 800. In a preferred embodiment, the porous carbon material particles 810 are uniformly and/or homogenously mixed, dispersed, distributed, suspended, and/or encapsulated in the structural hydrogel 800. The porous carbon material particles 810 preferably comprise or consist of graphene.

The porous carbon material particles 810 are surrounded by the structural hydrogel 800 such that the surface of each porous carbon material particles 810 is exposed to conductance (FIG. 8A) or emittance (FIG. 8B) omnidirectionally. In FIG. 8A, electrons are conducted from the porous carbon material particles 810 to the cathode (e.g., discharge). In FIG. 8B, positrons/holes are conducted from the anode to the porous carbon material particles 810. The conductivity/transfer of ions through the structural hydrogel 800, whether to/from the porous carbon material particles 810 or through the structural hydrogel 800, occurs in the electrolyte-saturated soft hydrophilic segments.

Figure 9:
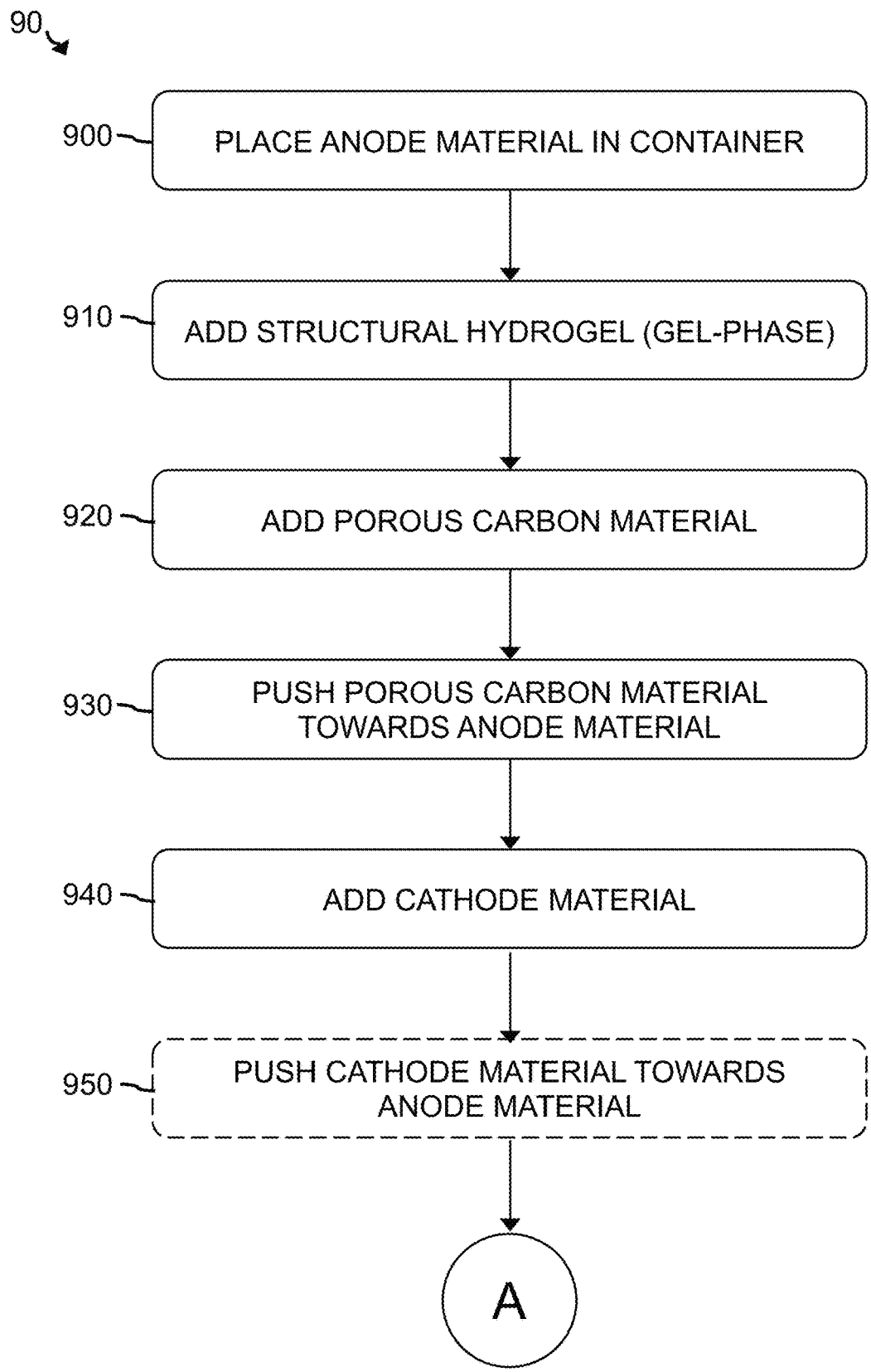
FIG. 9 is a flow chart of a method for manufacturing a rechargeable energy-storage device according to an embodiment.
Figure 9:
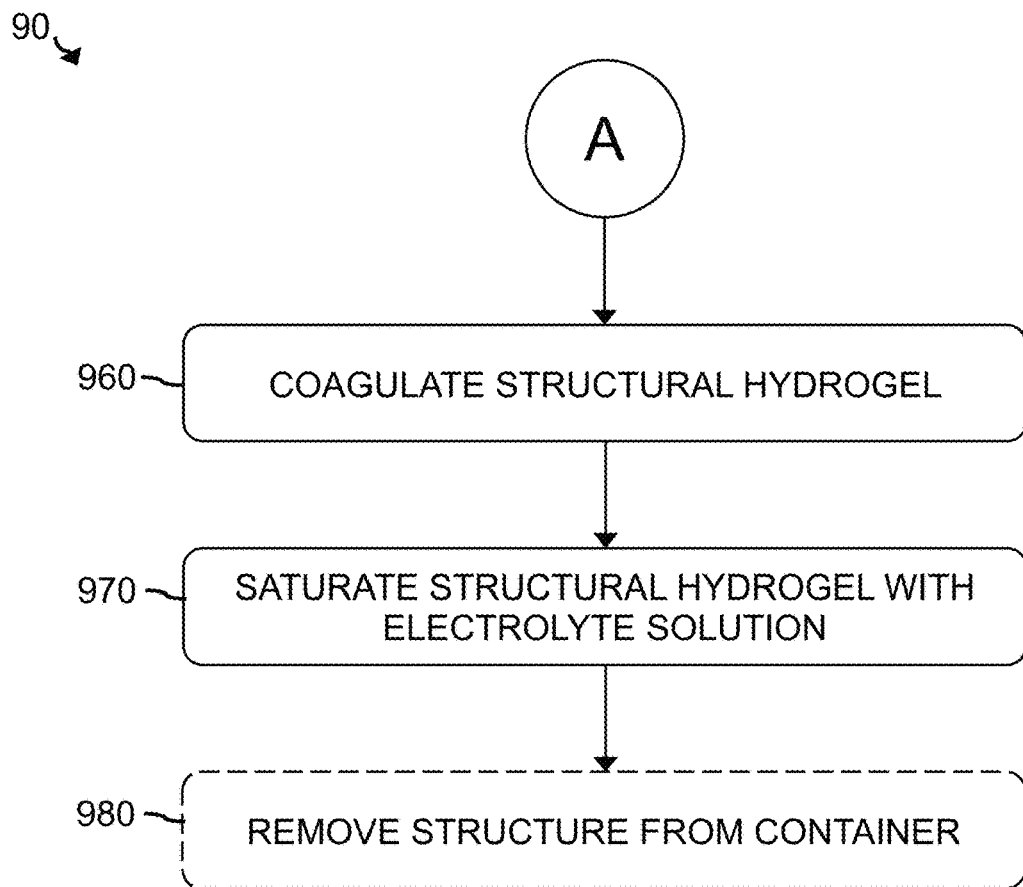

FIG. 9 is a flow chart of a method 90 for manufacturing a rechargeable energy-storage device according to an embodiment. Method 90 can be used to manufacture rechargeable energy-storage devices 10, 40, 50, and/or 60.

Figure 10:
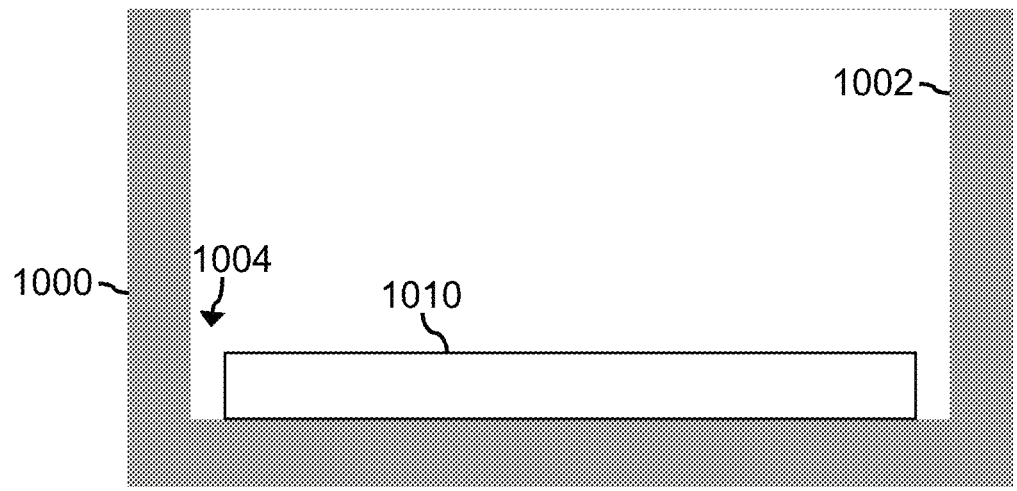
FIG. 10 illustrates a cross-sectional view of a structure that can be formed in the first step of the method illustrated in FIG. 9.

In step 900, anode material is placed in a container, mold, or vessel (in general, container). The container is preferably non-reactive with respect to the materials used in method 90. In one example, the non-reactive container is glass. The anode material can comprise or consist of aluminum, copper, nickel, or another conductive metal. In one example, the conductive metal can comprise a film, a foil, a foam, and/or a sheet. In a specific example, the conductive metal can comprise a copper film, a copper foil, a copper foam, and/or a copper sheet. The conductive metal can be porous, such as a porous copper foil, a porous copper foam, and/or a woven (e.g., open web porous) copper sheet. The anode material 1010 preferably forms a layer at the bottom of the container 1000, for example as illustrated in FIG. 10. The anode material 1010 can extend to the internal sides 1002 of the container 1000 there can be a gap 1004 between the anode material 1010 and the internal sides 1002 of the container 1000. The gap 1004 can be preferred when the anode material 1010 is porous to allow the structural hydrogel to flow around and/or into the anode material 1010.

In step 910, structural hydrogel is added to the container. The structural hydrogel is in a gel or liquid phase allowing the structural hydrogel to be poured into the container and onto the anode material. The structural hydrogel is preferably PH-PAN but other structural hydrogels can be used. The structural hydrogel has a predetermined grade or percent hydrolysis to provide a predetermined ratio of soft hydrophilic segments to hard hydrophobic segments.

Figure 11:
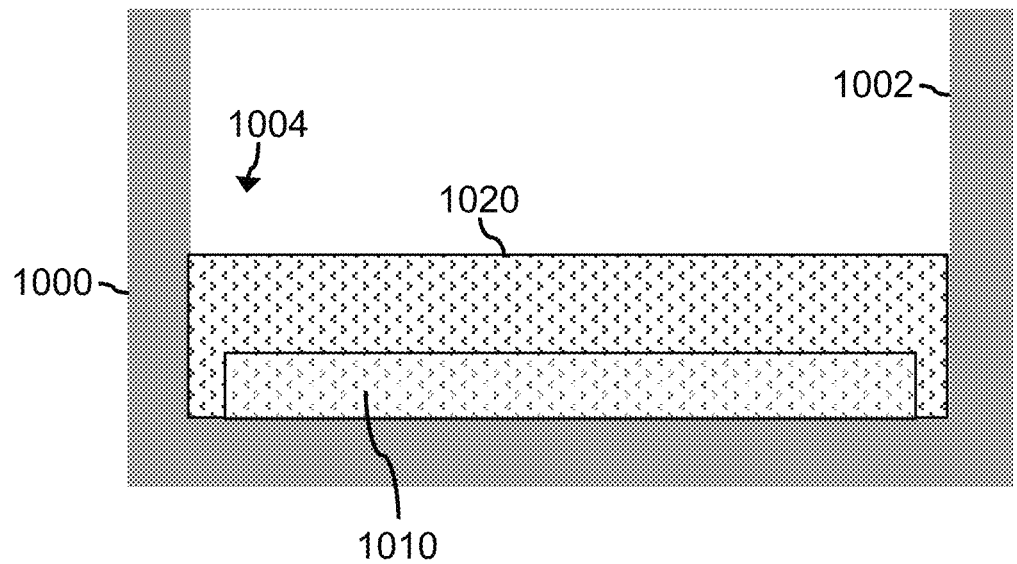
FIG. 11 illustrates a cross-sectional view of a structure that can be formed in the second step of the method illustrated in FIG. 9.

FIG. 11 illustrates an example cross-sectional view of the structure formed in step 910. The structural hydrogel 1020 is disposed on the anode material 1010 to form a layer on and in physical contact with the anode material 1010. When the anode material 1010 is porous, the structural hydrogel 1020 can flow into the pores of the anode material 1010 to become embedded therein, as illustrated in FIG. 11. The structural hydrogel 1020 can fill any gaps 1004 between the anode material and the internal sides 1002 of the container 1000.

In step 920, porous carbon material is added to the container. The porous carbon material can be in the form of foam, a foil, and/or particles. The porous carbon material is added (e.g., placed or poured) on top of the structural hydrogel to form a layer thereon.

Figure 12:
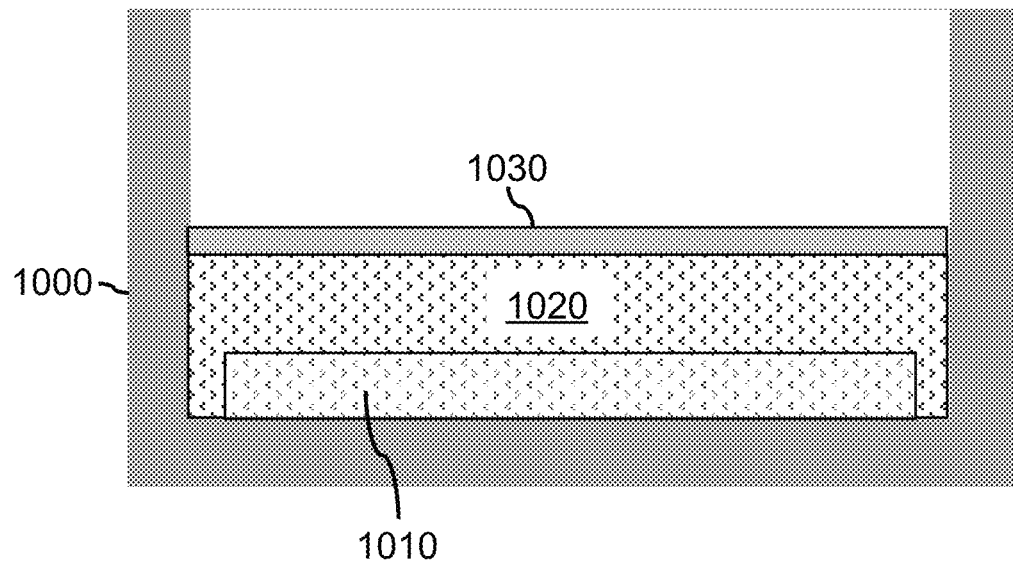
FIG. 12 illustrates a cross-sectional view of a structure that can be formed in the third step of the method illustrated in FIG. 9.

FIG. 12 illustrates an example cross-sectional view of the structure formed in step 920. The porous carbon material 1030 is disposed on the structural hydrogel 1020 to form a layer on and in physical contact with the structural hydrogel 1020.

In step 930, the porous carbon material is pushed toward the anode material. The porous carbon material is preferably pushed on and/or in physical contact with the anode material. Alternatively, a gap can be disposed between the porous carbon material and the anode material.

Figure 13:
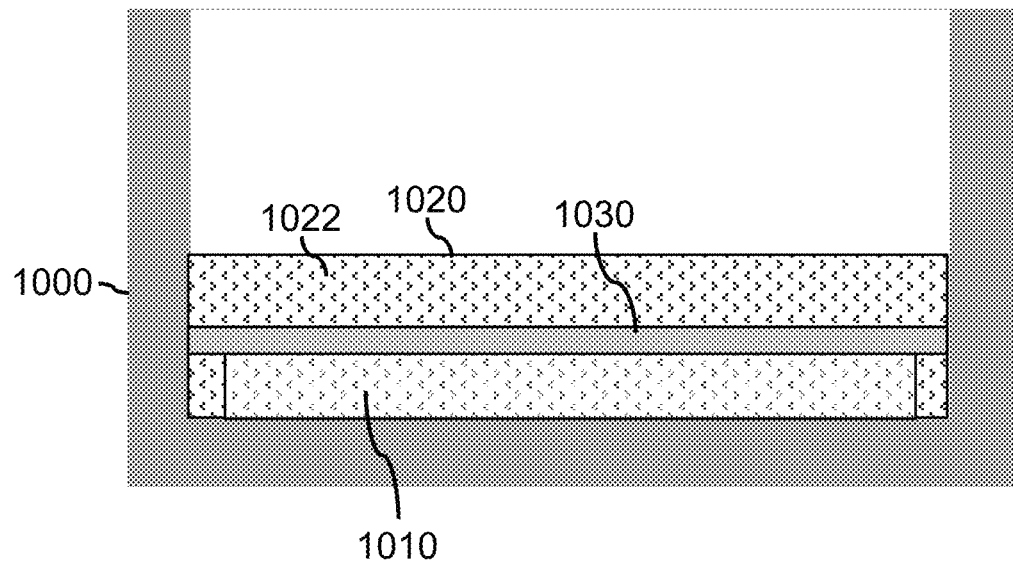
FIG. 13 illustrates a cross-sectional view of a structure that can be formed in the fourth step of the method illustrated in FIG. 9.

FIG. 13 illustrates an example cross-sectional view of the structure formed in step 930. The porous carbon material 1030 is disposed on and/or in direct physical contact with the anode material 1010. In addition, the porous carbon material 1030 is disposed between the anode material 1010 and a volume 1022 of the structural hydrogel 1020. The structural hydrogel 1020 can be embedded in the pores of the porous carbon material 1030.

In step 940, cathode material is placed in the container. The cathode material can comprise or consist of aluminum, copper, nickel, or another conductive metal. In one example, the conductive metal can comprise a film, a foil, a foam, and/or a sheet. In a specific example, the conductive metal can comprise an aluminum film, an aluminum foil, an aluminum foam, and/or an aluminum sheet. The conductive metal can be porous, such as a porous aluminum foil, a porous aluminum foam, and/or a woven (e.g., open web porous) aluminum sheet.

Figure 14:
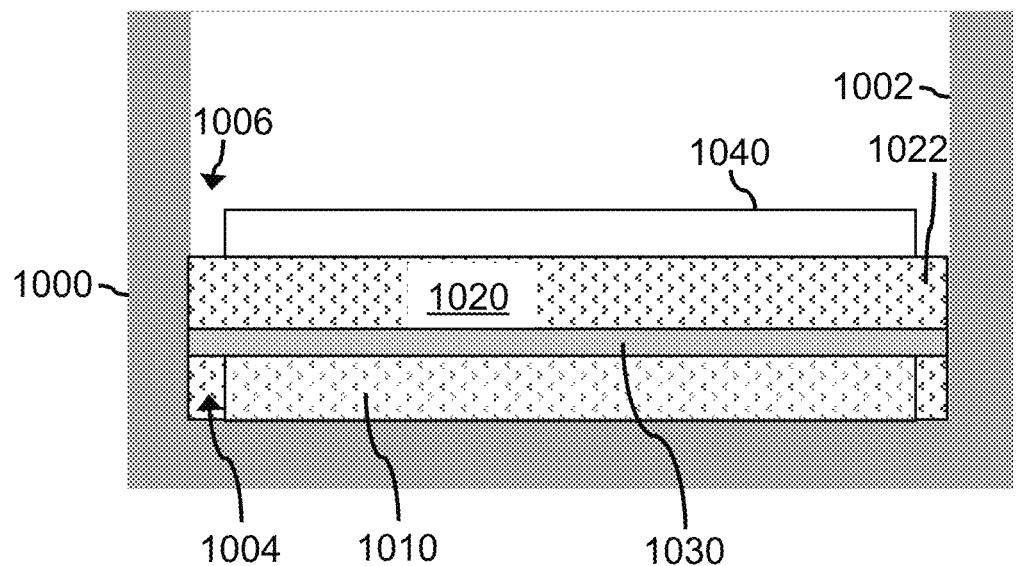
FIG. 14 illustrates a cross-sectional view of a structure that can be formed in the fifth step of the method illustrated in FIG. 9.

FIG. 14 illustrates an example cross-sectional view of the structure formed in step 940. The cathode material 1040 is disposed on and/or in direct physical contact with the structural hydrogel 1020. The volume 1022 of the structural hydrogel 1020 is disposed between the porous carbon material 1030 and the cathode material 1040. The cathode material 1040 can extend to the internal sides 1002 of the container 1000 or there can be a gap 1006 between the cathode material 1040 and the internal sides 1002 of the container 1000. The gap 1006 can be preferred when the cathode material 1040 is porous to allow the structural hydrogel 1020 to flow around and/or into the cathode material 1040. The gaps 1004, 1006 can be about the same size or different sizes. In some embodiments, the gaps 1004, 1006 are aligned with respect to a vertical axis.

Figure 15:
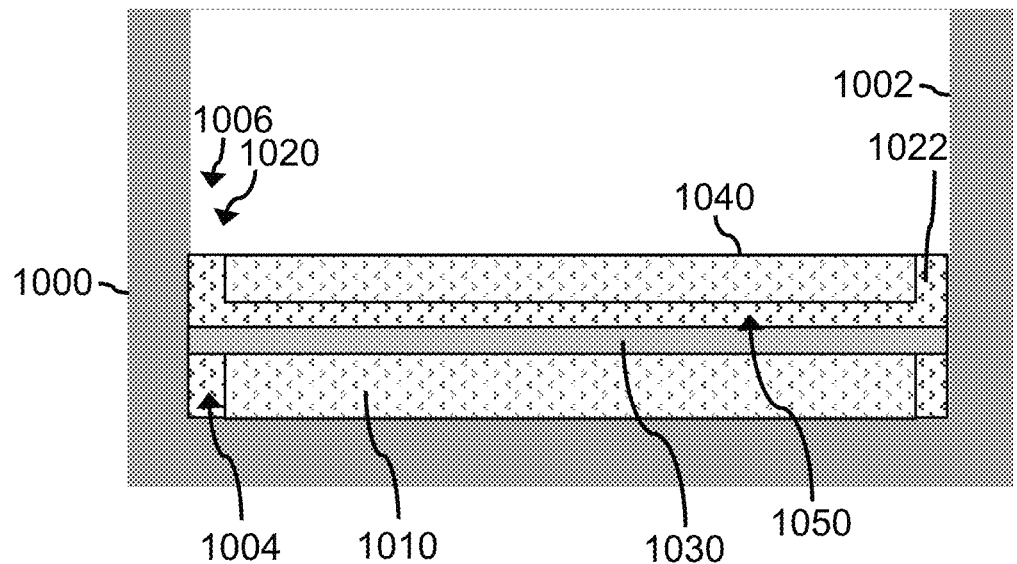
FIG. 15 illustrates a cross-sectional view of a structure that can be formed in the optional sixth step of the method illustrated in FIG. 9.

In optional step 950, the cathode material is pushed towards the anode material. Pushing the cathode material towards the anode material can increase or enhance the infiltration of the structural hydrogel into the anode material 1010 when the anode material is porous. In addition, pushing the cathode material towards the anode material can increase or enhance the infiltration of the structural hydrogel into the porous carbon material. When the cathode material is porous, pushing the cathode material 1040 towards the anode material 1010 can at least partially submerge the cathode material 1040 in the structural hydrogel 1020 to allow the structural hydrogel 1020 to become embedded in the pores of the cathode material 1040, for example as illustrated in FIG. 15. When the cathode material 1040 is pushed towards the anode material 1010, a minimum gap 1050 is preferably maintained between the cathode material 1040 and the porous carbon material 1030 to provide a minimum volume of structural hydrogel 1020 between the cathode material 1040 and the porous carbon material 1030. This minimum volume of structural hydrogel 1020 will provide a minimum volume of electrolyte solution between the cathode material 1040 and the porous carbon material 1030 when the electrolyte solution is added.

In step 960 (via placeholder A), the structural hydrogel is coagulated to transition the gel-phase structural hydrogel into a solid-phase structural hydrogel. The gelled structural hydrogel can be coagulated by rinsing it several times with distilled water. For example, the container can be filled one or more times with distilled water, which can be exchanged with the solvent in the gel-phase structural hydrogel.

In step 970, the solid-phase structural hydrogel is saturated with an aqueous electrolyte solution such as aqueous LiCl, NaCl, $MgCl_2$, or another electrolyte or salt. The solid structural hydrogel can be saturated with aqueous electrolyte solution by the solid structural hydrogel rinsing several times with the aqueous electrolyte solution. For example, the container can be filled one or more times with the aqueous electrolyte solution, which can be exchanged with the distilled water.

In some embodiments, the solid-phase structural hydrogel can be saturated with an electrolyte solution in an environment in which the electrolyte solution is naturally occurring. In one example application, the structure (e.g., rechargeable energy-storage device) including the solid-phase structural hydrogel can be implanted into a mammal (e.g., human or other mammal) in which case the bodily fluid of the mammal can function as the aqueous electrolyte solution. The rechargeable energy-storage device can be electrically coupled to a medical device to provide power thereto. It is believed that the rechargeable energy-storage device would not need to be replaced once implanted. The medical device powered by the rechargeable energy-storage device can be a therapeutic, diagnostic, sensor, communication, and/or another medical device. For example, the medical device can measure pH, temperature, and/or pressure and can transmit the measured data to an external receiver, such as through a local wireless transmission protocol (e.g., Bluetooth). In another example application, the structure (e.g., rechargeable energy-storage device) including the solid-phase structural hydrogel can be submerged in the ocean to power a device for a marine application in which case the salt water from the ocean can function as the aqueous electrolyte solution.

The pH of the electrolyte solution can be adjusted to increase or decrease the swell or shrinkage of the coagulated solid-phase structural hydrogel when saturated with the electrolyte solution. The swell corresponds to the volume of electrolyte solution that can be retained in the saturated coagulated solid-phase structural hydrogel. If a different swell is desired, the electrolyte solution can have a pH that is opposite to or different than that used for the hydrolysis catalyst. For example, if the hydrolysis catalyst is acidic, a basic electrolyte solution can be used to reduce swell. For example, hydrolysis of PAN with an acidic catalyst will minimize and manage swelling or shrinkage of the PH-PAN when subjected to a basic electrolyte. Conversely, hydrolysis of PAN with a basic pH catalyst can be implemented for applications where an acidic pH electrolyte might cause shrinkage (rather than swelling). Alternatively, hydrolysis of PAN with a basic pH catalyst will not swell noticeably in aqueous solutions (e.g., electrolyte solutions) having a pH of about 4 to about 8. However, hydrolysis of PAN with a basic pH catalyst would shrink when introduced to an aqueous solution (e.g., electrolyte solution) having a pH of greater than about 8. Thus, the grade of the PH-PAN can be related to the pH of the hydrolysis catalyst and/or the relationship (e.g., similarity or difference) between the pH of the hydrolysis catalyst and the pH of the electrolyte.

In non-battery applications, the pH of an aqueous solution into which the PH-PAN is introduced can increase or decrease the swell or shrinkage of the coagulated solid-phase structural hydrogel, when saturated with the aqueous solution, in the same or similar manner as discussed above with respect to saturation with an electrolyte solution.

In optional step 980, the structure (e.g., rechargeable energy-storage device) is removed from the container. Optional step 980 can occur before or after step 970.

Figure 16:
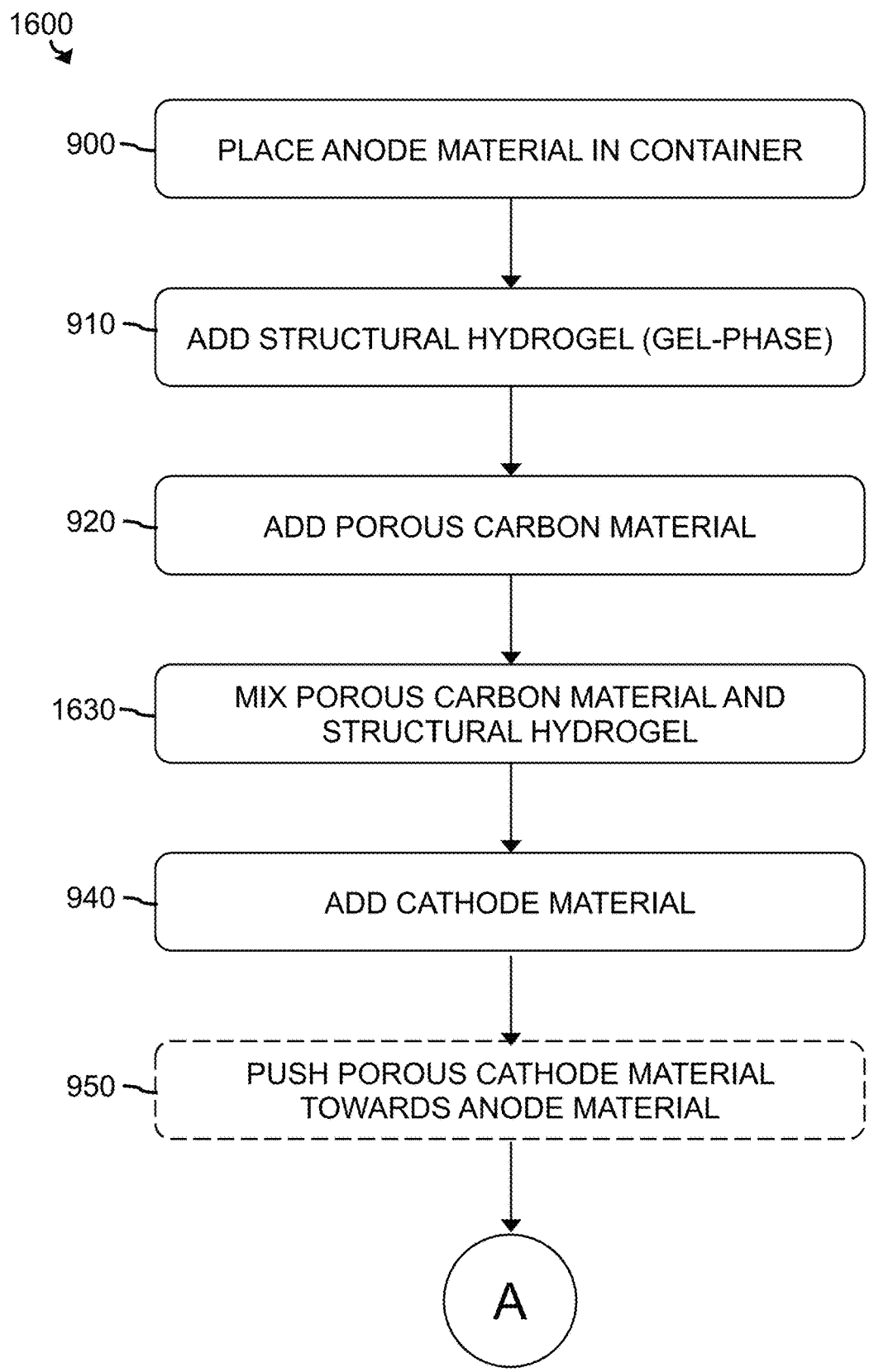
FIG. 16 is a flow chart of a method for manufacturing a rechargeable energy-storage device according to another embodiment.
Figure 16:
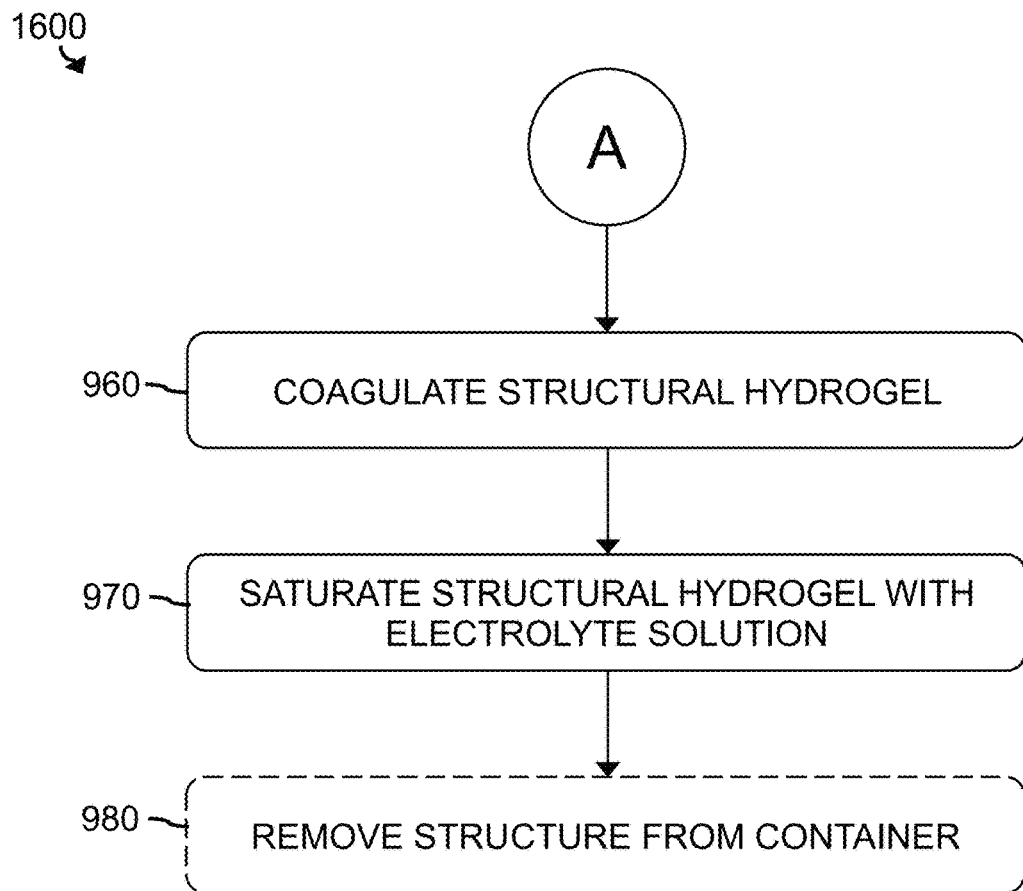

FIG. 16 is a flow chart of a method 1600 for manufacturing a rechargeable energy-storage device according to another embodiment. Method 1600 can be used to manufacture rechargeable energy-storage device 70.

Method 1600 is the same as method 90 except that method 1600 includes step 1630 in which the porous carbon material and the gelled structural hydrogel are mixed (e.g., preferably uniformly mixed) when the porous carbon material is in the form of particles, granules, pellets, or similar form (in general, particles). Alternatively, the porous carbon material and the gelled structural hydrogel can be premixed (e.g., preferably uniformly premixed) such that the structural hydrogel and the porous carbon material are added simultaneously (i.e., steps 910 and 920 occur simultaneously). Step 1630 is optional when the porous carbon material and the gelled structural hydrogel are premixed. Method 1600 does not include step 930 (pushing porous carbon towards anode material), though step 930 can be included in some embodiments.

Figure 17:
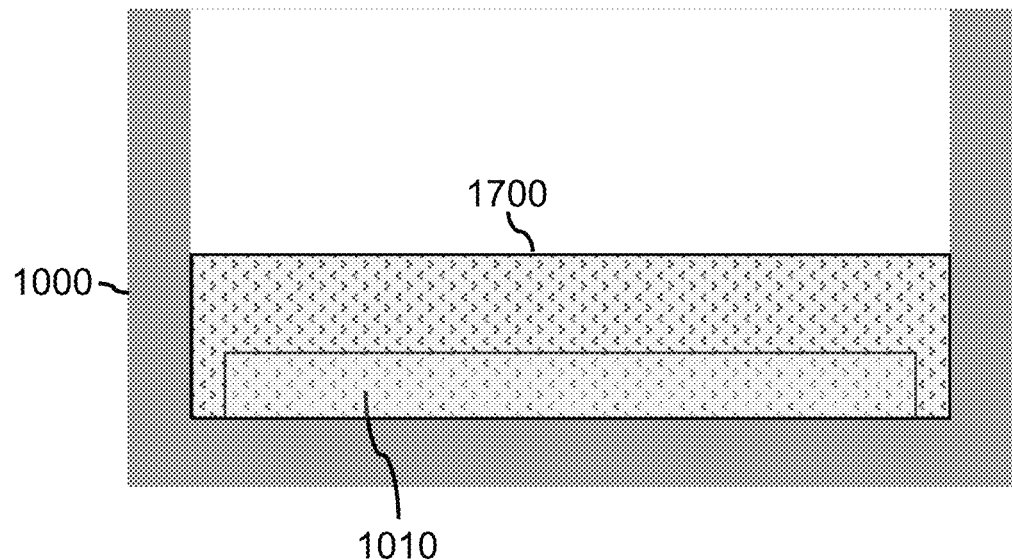
FIG. 17 illustrates a cross-sectional view of a structure that can be formed in the fourth step of the method illustrated in FIG. 16.

FIG. 17 illustrates an example cross-sectional view of the structure formed when the porous carbon material and the gelled structural hydrogel are mixed, which can occur in step 1630, or when the porous carbon material and the gelled structural hydrogel are premixed. The structure includes a mixed material 1700 disposed on and/or over the anode material 1010. The mixed material 1700 includes a mixture and/or suspension of the porous carbon material particles and gelled structural hydrogel. The porous carbon material is preferably uniformly or substantially uniformly mixed, dispersed, suspended, distributed, and/or encapsulated in the gelled structural hydrogel. When the anode material 1010 is porous, the mixed material 1700 can flow into the pores of the anode material 1010 to become embedded therein, as illustrated.

Figure 18:
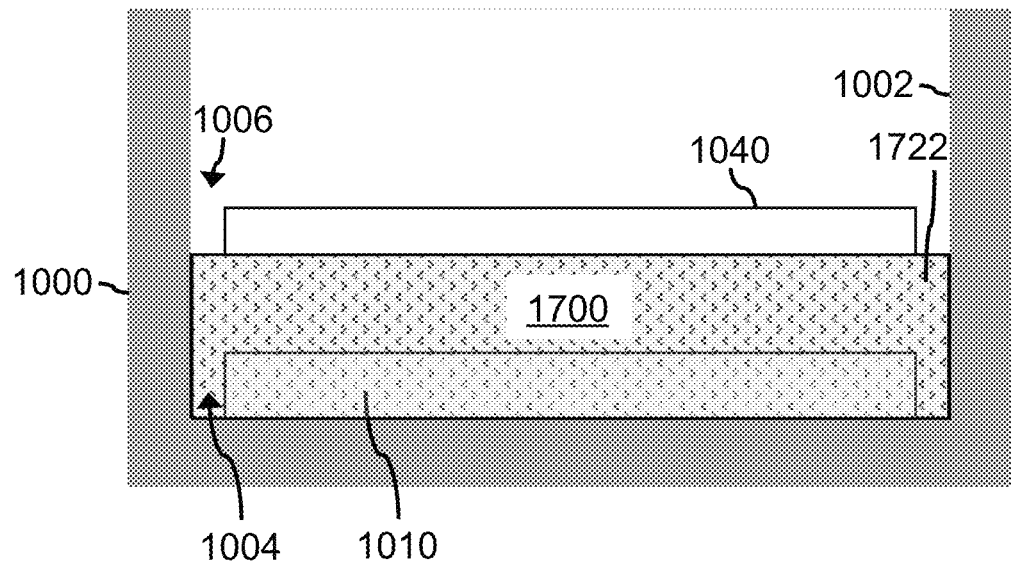
FIG. 18 illustrates a cross-sectional view of a structure that can be formed in the fifth step of the method illustrated in FIG. 16.

FIG. 18 illustrates an example cross-sectional view of the structure formed in step 940 of method 1600. The cathode material 1040 is disposed on and/or in direct physical contact with the mixed material 1700. A volume 1722 of the mixed material 1700 is disposed between the anode material 1010 and the cathode material 1040. The cathode material 1040 can extend to the internal sides 1002 of the container 1000 or there can be a gap 1006 between the cathode material 1040 and the internal sides 1002 of the container 1000. The gap 1006 can be preferred when the cathode material 1040 is porous to allow the mixed material 1700 to flow around and/or into the cathode material 1040. The gaps 1004, 1006 can be about the same size or different sizes. In some embodiments, the gaps 1004, 1006 are aligned with respect to a vertical axis. The mixed material 1700 can also flow around and/or into the anode material 1010 when the anode material 1010 is porous (e.g., as illustrated).

Figure 19:
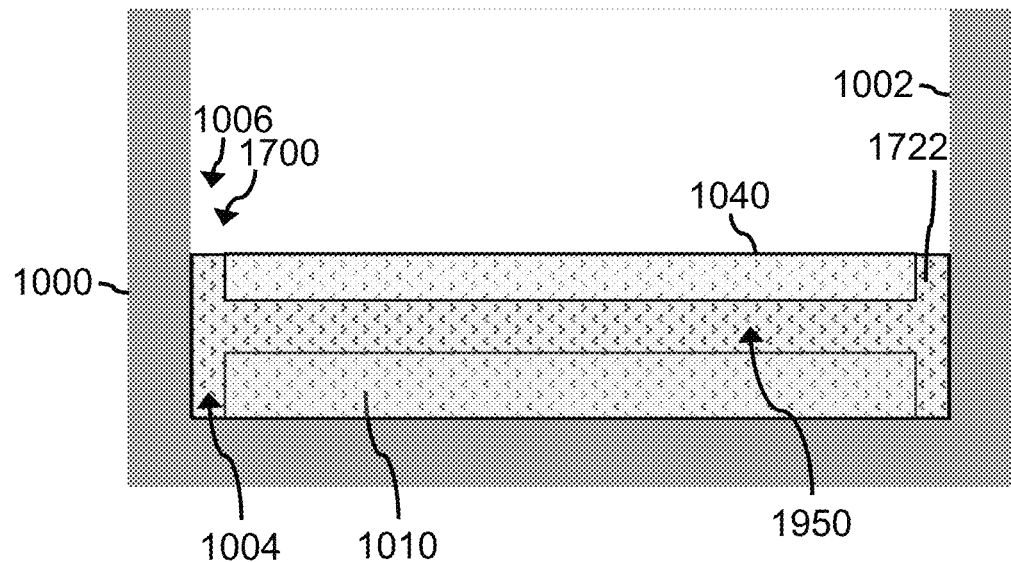
FIG. 19 illustrates a cross-sectional view of a structure that can be formed in the optional sixth step of the method illustrated in FIG. 16.

FIG. 19 illustrates an example cross-sectional view of the structure formed in optional step 950 of method 1600. When the cathode material is porous, pushing the cathode material 1040 towards the anode material 1010 can at least partially submerge the cathode material 1040 in the mixed material 1700 to allow the mixed material 1700 to become embedded in the pores of the cathode material 1040. A minimum gap 1950 is preferably maintained between the cathode material 1040 and the anode material 1010 to provide a minimum volume of mixed material 1700 between the cathode material 1040 and the anode material 1010. This minimum volume of mixed material 1700 will provide a minimum volume of electrolyte solution between the cathode material 1040 and the anode material 1010 when the electrolyte solution is added.

Figure 20:
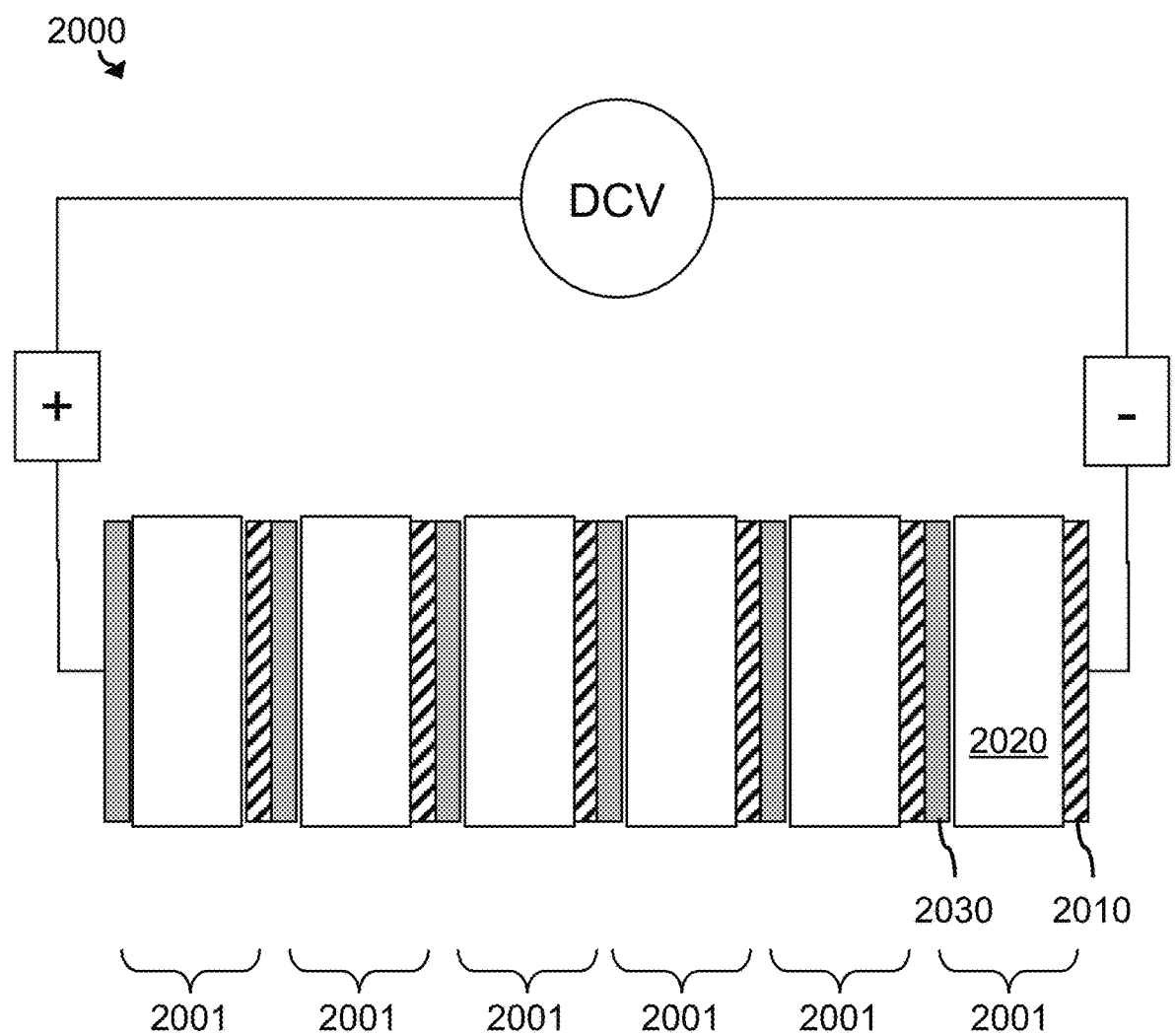
FIG. 20 is a block diagram of an assembly that includes a plurality of rechargeable energy-storage devices that are electrically coupled in series, according to an embodiment.

FIG. 20 is a block diagram of an assembly 2000 that includes a plurality of rechargeable energy-storage devices 2001 that are electrically coupled in series. Each device 2001 includes an anode 2010, a structural hydrogel 2020, and a cathode 2030. In neighboring devices, the anode 2010 of a first device is electrically coupled to the cathode 2030 of a second device. Each device 2001 preferably includes a porous carbon material as described herein. The voltage across the assembly 2000 is the sum of the voltage across each device 2001. For example, when the voltage across each device 2001 is 1.7 VDC and there are 6 devices or cells 2001, the voltage across the assembly 2000 is 10.2 VDC. The sum of the current capacity for the assembly 2000 is also equal to the sum of the current capacity of each device or cell 2001.

Figure 21:
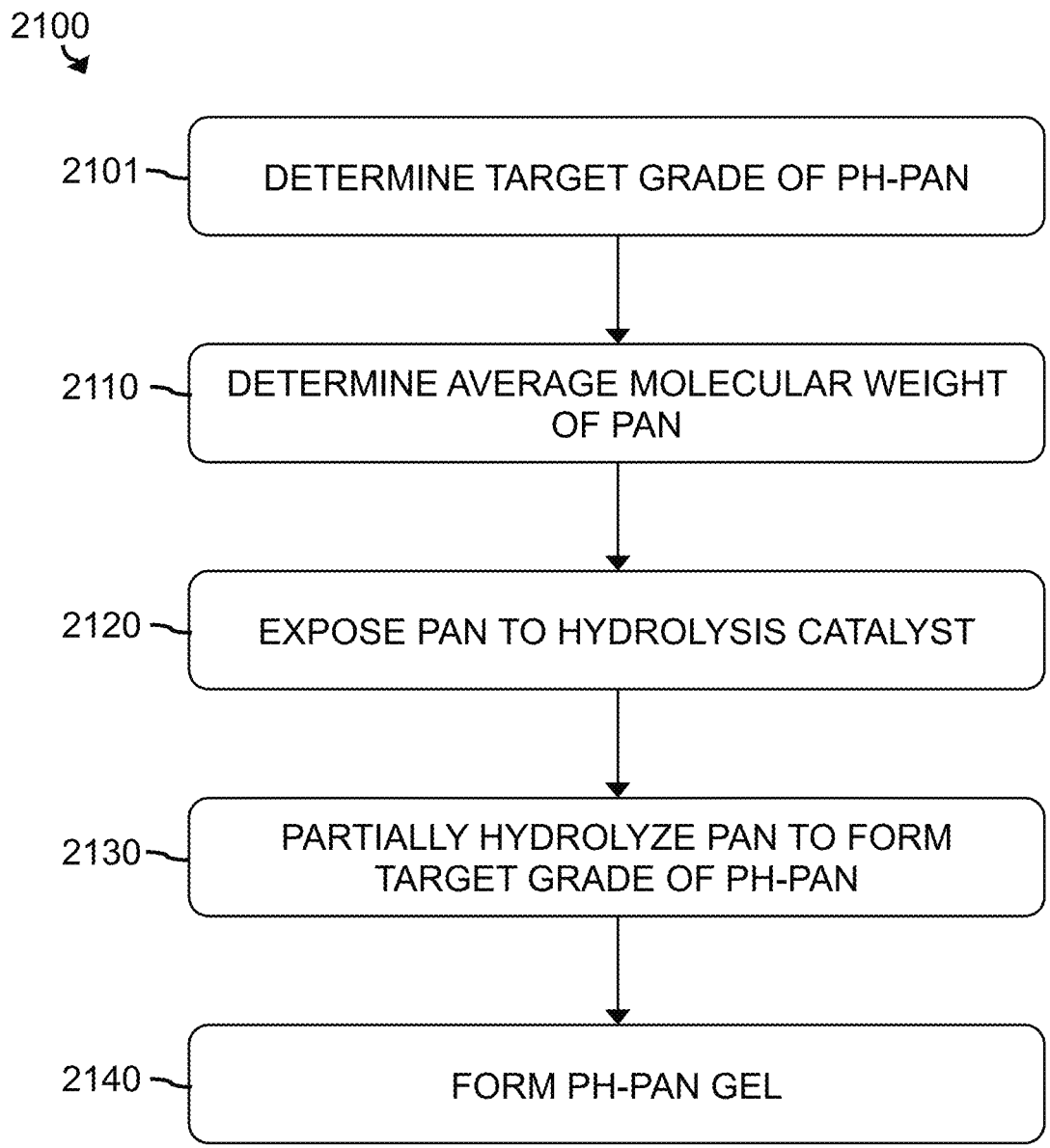
FIG. 21 is a flow chart of a method for manufacturing a PH-PAN gel according to an embodiment.

FIG. 21 is a flow chart of a method 2100 for manufacturing a PH-PAN gel, which can be used to make the rechargeable energy-storage devices described herein. In step 2101, a target grade of the PH-PAN gel is determined. The target grade corresponds to and/or is the same as the percentage hydrolysis of the PAN in the PH-PAN gel. The target grade can also include the pH of the hydrolysis catalyst used to form the PH-PAN. For example, the pH of the hydrolysis catalyst can be related to the swell of the PH-PAN, which can vary depending on the pH of the electrolyte solution in which the PH-PAN is saturated after coagulation.

For the rechargeable energy-storage device application, the target grade of the PH-PAN gel can be about 30% to about 45%, including about 35%, about 40%, and/or any range or value between any two of the foregoing percentages. In other embodiments of the rechargeable energy-storage device application, the target grade of the PH-PAN gel can be lower than about 30%, such as about 25% or about 20%, or higher than about 45%, such as about 50% or about 55%. A higher target grade results in a higher ratio of soft hydrophilic segments to hard hydrophobic segments, which can result in an increased ability of the PH-PAN gel to swell and become saturated with a greater volume of electrolyte solution per volume of PH-PAN gel. The target grade can be the same as the ratio of soft hydrophilic segments to hard hydrophobic segments. However, a higher target grade results in a decrease in mechanical strength of the PH-PAN gel.

When the interior volume of the rechargeable energy-storage device is a limitation, it may be preferable to use a smaller amount of a relatively high (e.g., more swell) grade (e.g., at least about 40%) of PH-PAN gel. When the interior volume of the rechargeable energy-storage device is not a limitation, it may be preferable to use a larger amount of a relatively low (e.g., less swell) grade (e.g., less than or equal about 30%) of PH-PAN gel, which can be saturated with about the same total volume of electrolyte solution as the relatively high grade of PH-PAN gel.

For other applications, the target grade of the PH-PAN gel can be anywhere from about 10% (or lower) to about 90% (or higher).

In step 2110, the average molecular weight of a base PAN is determined. The average molecular weight of the base PAN can be determined by reviewing the product packing or by performing one or more analytical chemistry techniques. The target grade and/or the average molecular weight can correspond to one or more target physical properties of the PH-PAN.

For the rechargeable energy-storage device application and/or other applications, the average molecular weight of the base PAN can be in a range of about 150 k Dalton to about 300 k Dalton, including about 200 k Dalton, about 250 k Dalton, and/or any range or value between any two of the foregoing average molecular weights. In other embodiments of the rechargeable energy-storage device application and/or other applications, the average molecular weight of the base PAN can be less than about 150 k Dalton, such as about 100 k Dalton or about 125 k Dalton, or greater than about 300 k Dalton, such as about 325 k Dalton or about 350 k Dalton. In a preferred embodiment of the rechargeable energy-storage device application, the average molecular weight of the base PAN can be about 250 k Dalton to about 300 k Dalton. A higher average molecular weight of base PAN can provide a more accurate and/or a more reliable hydrolysis reaction. The use of base PANs having an average molecular weight of higher than 300 k Dalton can be a function of manufacturability and/or availability. In addition, a PH-PAN formed from a base PAN having a larger average molecular weight will have a greater viscosity and/or different thixotropic properties than that formed from a base PAN having a smaller average molecular weight.

In step 2120, the base PAN is exposed to a hydrolysis catalyst, which can be a base or an acid in an aqueous solution. The volumetric concentration of the hydrolysis catalyst is related (e.g., directly related) to the target grade of the PH-PAN and the average molecular weight of the base PAN. The concentration of the hydrolysis catalyst can be determined using a look-up table, a graph, a mathematical model/relationship, a computer program, or another method. An example of a basic hydrolysis catalyst is sodium hydroxide (NaOH). For a base PAN average molecular weight of about 150 k Dalton to about 300 k Dalton, the basic hydrolysis catalyst can be about 8% (by volume) to about 12% (by volume) aqueous NaOH, including about 9% (by volume), about 10% (by volume), about 11% (by volume), and/or any range or value between any two of the foregoing percentages. Examples of acidic hydrolysis catalysts include hydrogen chloride (HCl) and sulfuric acid ($H_2SO_4$). For example, the acidic hydrolysis catalyst can include 65% sulfuric acid (by weight).

The base PAN can be exposed to the hydrolysis catalyst by placing the base PAN in a container or mixing vessel that holds the hydrolysis catalyst solution and mixing using high shear. For example, the container can include mixing blades, at the bottom of the container, that rotate at a specific rotational rate (e.g., rotations per minute (RPMs) causing a vortex whereby by mixing occurs as fluid and/or material is/are drawn down and through the mixing blades repeatedly. The mixing blades can be sharp or dull. The base PAN resin can be added incrementally to (e.g., metered into) the total solvent solution which gets drawn down to the bottom of the container by the mixing blades and recirculates thereafter. The base PAN resin can be added in incremental amounts to the container over a predetermined time period. For example, about 5 grams of base PAN resin can be mixed with about 500 grams of hydrolysis catalyst solution for about 10 minutes. After about 10 minutes, an additional 5 grams of base PAN resin can be added to the container, for a total of 10 grams of base PAN resin and 500 grams of hydrolysis catalyst solution, and mixed for an additional about 10 minutes. This process can repeat until a total mass (e.g., 50 grams) of base PAN resin is added and mixed with the hydrolysis catalyst solution. As base PAN resin is added, the mixture can form a viscous and/or gel-like material. However, the sheer from the mixing blades can continue to create a vortex, which can promote material mixing and/or recirculation.

During mixing, the base PAN becomes partially hydrolyzed (step 2130). The temperature of the materials can increase during mixing due to shear forces and/or the partial-hydrolysis reaction. A cooling jacket can be placed on the mixing vessel to maintain a predetermined temperature. For example, the temperature can be maintained with the cooling jacket to about 150° F. to about 175° F., including about 155° F., about 160° F., about 165° F., about 170° F., or any range or value between any two of the foregoing temperatures. When properly mixed with appropriate ratios of components, the partial-hydrolysis reaction is self-terminating albeit a minimum time. The material can be sampled and tested to determine if the partial-hydrolysis reaction is complete. For example, the sampled material can be placed in a salt solution or distilled water to measure how much the sampled material swells. The volumetric swelling of the sampled material can be compared with the known volumetric swelling of the same grade of material. Alternatively, a look-up table, a mathematic model, or another method can be used to determine if the measured swell of the sampled material is the same or about the same as the known volumetric swelling of the same grade of material. Additionally, or alternatively, Carbon-13 (C13) nuclear magnetic resonance can be used to analyze the molar ratio of the sampled material, which can be compared the target molar ratio at complete and/or uniform conversion/reaction.

In some embodiments, the type (acid or base) of hydrolysis catalyst can be selected based on the target environment or application for the PH-PAN. For example, it may be desirable for the PH-PAN to shrink in the target environment, in which case the type of hydrolysis catalyst can selected to be opposite to that of the target environment. For example, if the target environment is acidic (e.g., in a ureteral stent exposed to acidic urine) and shrinking is desired, a basic hydrolysis catalyst can be used to form the PH-PAN. When exposed to the acidic environment, the PH-PAN may become rigid as the soft hydrophilic segments are de-hydrolyzed by the acid, resulting a decreased ratio of soft hydrophilic segments to hard hydrophobic segments in the PH-PAN. Conversely, it may be desirable for the PH-PAN to remain stable in the target environment, in which case the type of hydrolysis catalyst can selected to be the same as that of the target environment. For example, if the target environment is acidic (e.g., in a ureteral stent exposed to acidic urine) and stability is desired, an acidic hydrolysis catalyst can be used to form the PH-PAN. When exposed to the acidic environment, the PH-PAN will remain approximately the same when saturated with the appropriate isotonic saline (e.g., essentially an electrolyte).

Figure 22:
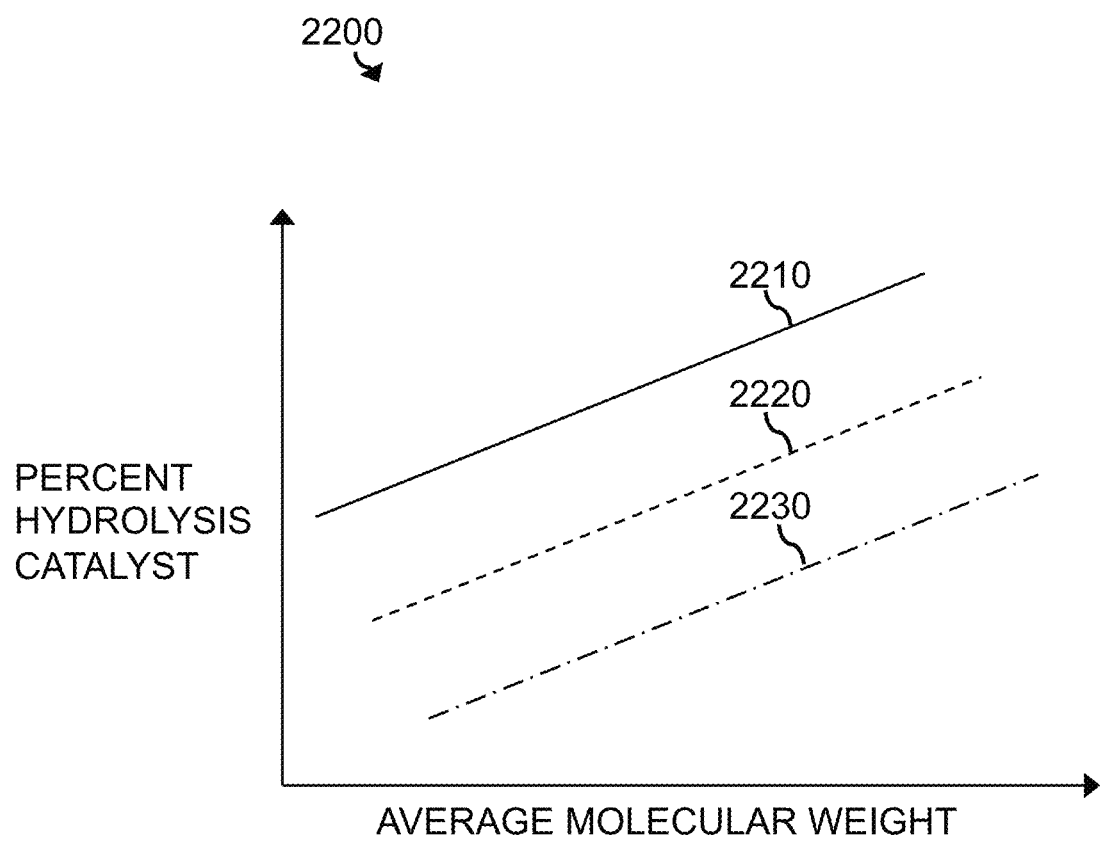
FIG. 22 is an example of a graph that illustrates a relationship between the average molecular weight of the base PAN and the percent concentration of hydrolysis catalyst.

FIG. 22 is an example of a graph 2200 that illustrates the relationship between the average molecular weight of the base PAN and the percent concentration of hydrolysis catalyst. Line 2210 represents a first grade of PH-PAN, line 2220 represents a second grade of PH-PAN, and line 2230 represents a third grade of PH-PAN. As can be seen from line 2210, to produce the first grade of PH-PAN using a relatively low average molecular weight of base PAN, a relatively low percent concentration of hydrolysis catalyst is used. In contrast, to produce the first grade of PH-PAN using a relatively high average molecular weight of base PAN, a relatively high percent concentration of hydrolysis catalyst is used. The same relationship applies for lines 2220 and 2230 which represent second and third grades, respectively, of PH-PAN. The first grade (line 2210) of PH-PAN has a higher ratio of soft hydrophilic segments to hard hydrophobic segments than that of the second and third grades (lines 2220 and 2230, respectively) of PH-PAN. The second grade (line 2220) of PH-PAN has a higher ratio of soft hydrophilic segments to hard hydrophobic segments than that of the third grade (line 2230) of PH-PAN and lower ratio of soft hydrophilic segments to hard hydrophobic segments than that of the first grade (line 2210).

The graph 2000 also illustrates that for a given average molecular weight, a relatively high percent concentration of hydrolysis catalyst is used to produce the first grade of PH-PAN (line 2210) compared to that used to produce the second and third grades (lines 2220 and 2230, respectively) of PH-PAN. The percent concentration of hydrolysis catalyst used to produce the second grade of PH-PAN (line 2220) is relatively lower than that used to produce the first grade (line 2210) of PH-PAN and relatively higher than that used to produce the third grade (line 2230) of PH-PAN.

Thus, for a given average molecular weight of base PAN, increasing the percent concentration of hydrolysis catalyst increases the ratio of soft hydrophilic segments to hard hydrophobic segments in the PH-PAN, which corresponds to an increase in the grade of PH-PAN. Likewise, for a given average molecular weight of base PAN, decreasing the percent concentration of hydrolysis catalyst decreases the ratio of soft hydrophilic segments to hard hydrophobic segments in the PH-PAN, which corresponds to a decrease in the grade of PH-PAN. In addition, to maintain a consistent grade of PH-PAN, the percent concentration of hydrolysis catalyst increases with increasing average molecular weight of base PAN. Similarly, to maintain a consistent grade of PH-PAN, the percent concentration of hydrolysis catalyst decreases with decreasing average molecular weight of base PAN.

It is noted that although a similar relationship as in graph 2200 occurs for acidic and basic hydrolysis catalysts, separate graphs should be created and/or separate relationships defined for acidic hydrolysis catalysts and basic hydrolysis catalysts. The same type of acidic hydrolysis catalyst (e.g., HCl) is preferably used to create the graph and/or define the relationship for percent acidic hydrolysis catalyst versus average molecular weight of base PAN. The same type of basic hydrolysis catalyst (e.g., NaOH) is preferably used to create the graph and/or define the relationship for percent basic hydrolysis catalyst versus average molecular weight of base PAN.

Returning to FIG. 21, in step 2130 the base PAN is partially hydrolyzed according to the percentage concentration of hydrolysis catalyst and the average molecular weight of the base PAN. The percentage concentration of hydrolysis catalyst is selected based on the average molecular weight of the base PAN to produce the target grade of PH-PAN having a target ratio of soft hydrophilic segments to hard hydrophobic segments. The PH-PAN can have a liquid or liquid-like consistency.

Figure 23:
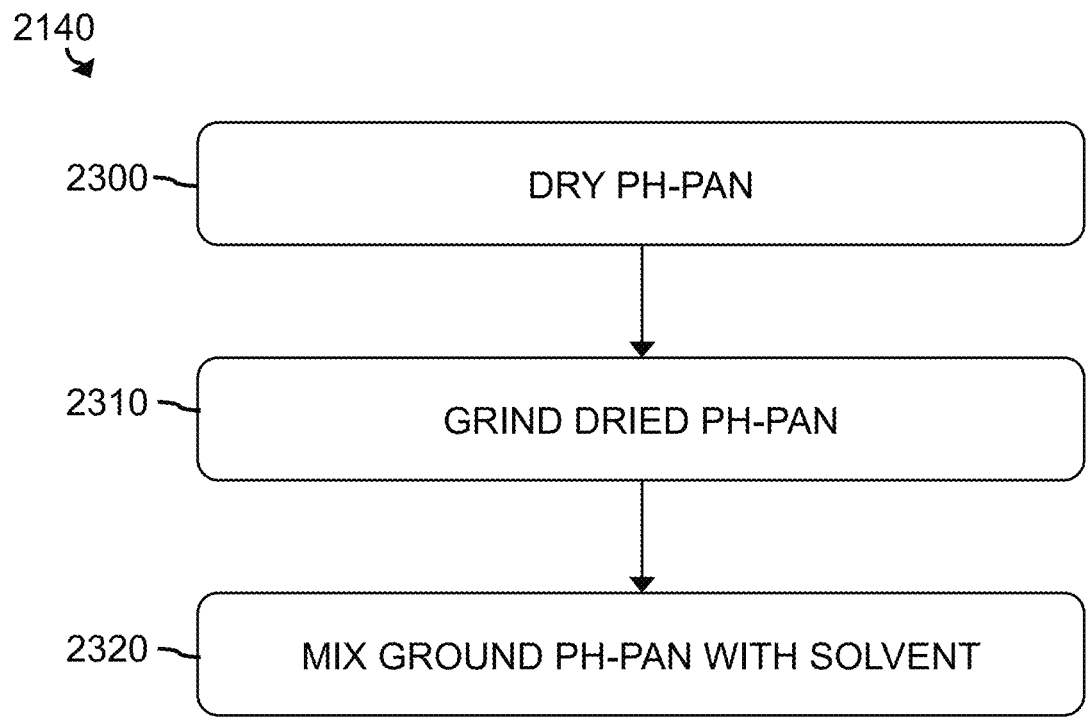
FIG. 23 is a flow chart of the fifth step of the method illustrated in FIG. 21.

In step 2140, the PH-PAN is formed into a gel. Addition details of step 2140 are provided in the flow chart illustrated in FIG. 23. In step 2300, the PH-PAN is dried to form a resin. The PH-PAN can be dried using heated air circulation and/or other methods. In step 2310, the dried PH-PAN (e.g., resin) is ground into a powder, for example using a mill (e.g., a coffee mill). A sieve can be used to capture a more precise distribution of resin. The particles in the powder can be round or semi-round with an average diameter, size, and/or dimension of about 150 microns or another size. In step 2320, the ground and/or powdered PH-PAN resin is mixed with an aqueous salt solution solvent, such as aqueous sodium thiocyanate (NaSCN), which causes the PH-PAN resin to form a gel, which can be viscous. The aqueous NaSCN preferably has a concentration or ratio of about 55% (by weight) though other concentrations/ratios can be used. In some embodiments, the mixture can include about 10% by weight of ground and/or powdered PH-PAN resin and about 90% by weight of aqueous NaSCN. In other embodiments, the mixture can include about 10% to about 20% by weight of ground and/or powdered PH-PAN resin and about 90% to about 80% by weight of aqueous NaSCN, respectively. The gelled PH-PAN can comprise a thick, viscous thixotropic Newtonian characteristic gel phase.

After a gel is formed, the PH-PAN can be coagulated by rinsing the gelled PH-PAN with distilled water. The gelled PH-PAN can be repeatedly rinsed (e.g., two to four times) with distilled water in some embodiments. Rinsing the gelled PH-PAN with water causes the NaSCN salt saturated in the soft hydrophilic segments of the gelled PH-PAN to be exchanged with water molecules. It is believed that the space in the soft hydrophilic segments once occupied by the NaSCN salt crystals becomes voids (e.g., voids 300) when the NaSCN salt diffuses out of the gel and is exchanged with water. A higher-grade PH-PAN can have more voids compared to a lower-grade PH-PAN. The concentration of voids corresponding porosity is believed to be related to the salt (e.g., NaSCN) concentration in the solvent, which can be about 25% by volume, which can be compressed due to swelling of the soft hydrophilic segments.

The PH-PAN can be formed without additives and without cross-linking. Unlike conventional hydrogels, the hydrolysis of PAN creates respective copolymers bound to each other rather than monomers being polymerized and "tangled" together. This allows the PH-PAN to have more hydrophilic groups without additional material (e.g., additives) which contribute to swell all the while maintaining its structural characteristics. The swell can expand into the voids formed during coagulation. For example, the soft hydrophilic segments are uniformly distributed or dispersed through the PH-PAN.

When the aqueous NaSCN solution pH and/or electrolyte pH is basic, the volumetric concentration of electrolyte can comprise up to about 95% of the coagulated gel phase. However, a specific concentration of coagulated end product or component swell can be engineered by specifying level of PAN hydrolysis (i.e., grade of PH-PAN). Similarly, the electrolyte pH and/or osmolarity can be adjusted to increase or decrease the swell.

For example, consider a gelled PH-PAN that is formed by mixing ground and/or powdered PH-PAN resin with an aqueous salt solution solvent of 55% (by weight) NaSCN (or other salt) and 45% (by weight) distilled water. The powdered PH-PAN resin and the aqueous salt solution solvent can be in a gravimetric ratio (i.e., by weight) of 10% solids (resin) and 90% aqueous salt solution solvent. The gelled PH-PAN can then be coagulated by rinsing the gelled PH-PAN with distilled water. The coagulated PH-PAN can be saturated with normal saline (i.e., 0.9% NaCl) and the coagulated PH-PAN can have the same or similar volumetric concentration as the gravimetric ratio of the powdered PH-PAN resin and the aqueous salt solution solvent. For example, a 10 cm$^3$ volume of 10% gel phase in 55% NaSCN/45% distilled water after coagulation and saturated with 0.9% NaCl saline can exhibit about a 10 cm$^3$ volume. A higher concentration of NaCl saline can cause a lower swell volume for a specific hydrolyzed resin. Similar results can be shown for saturating the coagulated PH-PAN with LiCl and MgCl solutions.

Figure 24A:
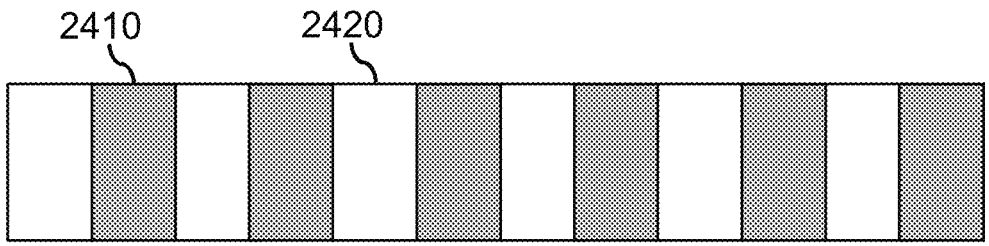
FIGS. 24A, B, and C are block diagrams of a PH-PAN to illustrate the uniform distribution of soft hydrophilic segments and hard hydrophobic segments, according to an embodiment.
Figure 24B:
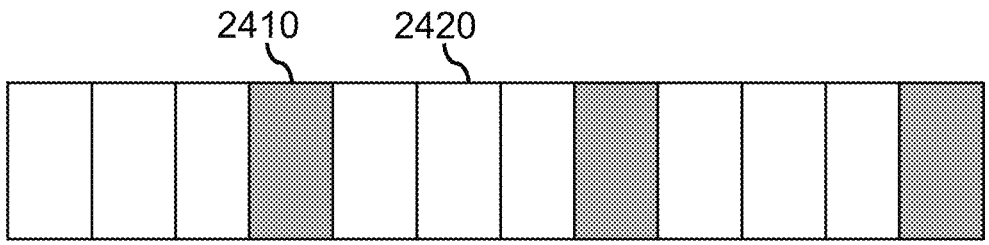
Figure 24C:
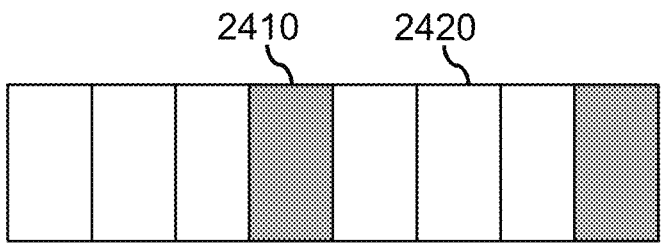

FIGS. 24A-C are block diagrams of a PH-PAN 2400A-C, respectively, to illustrate the uniform distribution of soft hydrophilic segments 2410 and hard hydrophobic segments 2420. PH-PAN 2400A and PH-PAN 2400B have a ratio of soft hydrophilic segments 2410 to hard hydrophobic segments 2420 of 50% and 25%, respectively, for the same chain length of PAN (i.e., same average molecular weight of base PAN). PH-PAN 2400C has the same ratio of soft hydrophilic segments 2410 to hard hydrophobic segments 2420 as PH-PAN 2400B (i.e., 25%) but with a shorter chain length (i.e., lower average molecular weight of base PAN).

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method of manufacturing a rechargeable energy-storage device, the method comprising:
   placing an anode material to form at least a portion of a first layer in a container;
   adding a gelled structural hydrogel to form at least a second layer in the container, the gelled structural hydrogel in physical contact with the anode material, the gelled structural hydrogel having hydrophilic segments and hydrophobic segments;
   adding a porous carbon material to the container to form at least a portion of a third layer in the container, the second layer between the first and third layers;
   pushing the porous carbon material toward the anode material such that the porous carbon material is located between the anode material and a volume of the gelled structural hydrogel;
   adding a cathode material to the container on the volume of the gelled structural hydrogel; and
   coagulating the gelled structural hydrogel to form a solid structural hydrogel.

2. The method of claim 1, further comprising saturating the solid structural hydrogel with an electrolyte solution.

3. The method of claim 1, wherein the gelled structural hydrogel comprises a partially-hydrolyzed polyacrylonitrile (PH-PAN) material.

4. The method of claim 3, wherein the hydrophilic segments and the hydrophobic segments are uniformly distributed within the PH-PAN.

5. The method of claim 3, wherein the PH-PAN material is hydrolyzed by about 30% to about 45%.

6. The method of claim 1, wherein the coagulating step includes mechanically coupling the solid structural hydrogel to the anode material.

7. A method of manufacturing a rechargeable energy-storage device, the method comprising:
   placing an anode material to form at least a portion of a first layer in a container;
   adding a mixed material to form at least a second layer in the container, the mixed material comprising a gelled structural hydrogel and porous carbon material particles, the porous carbon particles disposed in the gelled structural hydrogel;
   adding a cathode material at least a portion of a third layer in the container, the second layer between the first and third layers; and
   coagulating the gelled structural hydrogel to form a solid structural hydrogel.

8. The method of claim 7, further comprising:
   adding the gelled structural hydrogel to the container;
   adding the porous carbon material particles to the container; and
   mixing the gelled structural hydrogel and the porous carbon material particles to form the mixed material.

9. The method of claim 7, further comprising saturating the solid structural hydrogel with an electrolyte solution.

10. The method of claim 7, wherein:
    the gelled structural hydrogel comprises a partially-hydrolyzed polyacrylonitrile (PH-PAN) material, and
    the hydrophilic segments and the hydrophobic segments are uniformly distributed within the PH-PAN.

* * * * *